United States Patent [19]

Blount et al.

[11] Patent Number: 5,036,938
[45] Date of Patent: Aug. 6, 1991

[54] DISASSEMBLABLE RIDING SCOOTER

[76] Inventors: Wendell G. Blount, P.O. Box 1032; Henry L. Lackey, P.O. Drawer "T", both of Calhoun City, Miss. 38916; Ronald J. Mosetich, Rte. II, Box 35, Kosciusko, Miss. 39090; Bedford F. Peeples, 1609 Deering St., Cleveland, Miss. 38732; David L. Kimbro, 138 Gregory St., Calhoun City, Miss. 38916; William J. Saunders, 6011 Patillo Way, Lithonia, Ga. 30058; Lloyd M. Yardley, 1222 Timberglen Ct., Lilburn, Ga. 30247; J. Douglas Alsup, 3302 Creekside Ct., Conyers, Ga. 30208; Samuel C. Crosby, 1367 Red Fox Run, Lilburn, Ga. 30247

[21] Appl. No.: 322,491

[22] Filed: Mar. 13, 1989

[51] Int. Cl.⁵ .............................. B62D 61/08
[52] U.S. Cl. .................... 180/208; 180/216; 180/65.1; 180/68.5; 180/907
[58] Field of Search ............... 180/11, 16, 907, 208, 180/215, 216, 217, 68.5, 65.1, 210; 280/287, 278

[56] References Cited

U.S. PATENT DOCUMENTS

| | | | |
|---|---|---|---|
| 2,919,758 | 1/1960 | Newton et al. | 180/210 |
| 3,249,171 | 5/1966 | Kinghorn | 180/215 |
| 3,369,629 | 2/1968 | Weiss | 180/216 |
| 3,580,349 | 5/1971 | Brennan | 180/210 |
| 4,037,678 | 7/1977 | Braune | 180/11 |
| 4,042,055 | 8/1977 | Ward | 180/216 |
| 4,047,145 | 9/1977 | Schwehr | 180/65.1 |
| 4,452,327 | 6/1984 | Mowat et al. | 180/907 |
| 4,570,739 | 2/1986 | Kramer | 180/208 |
| 4,729,447 | 3/1988 | Morse | 180/907 |
| 4,750,578 | 6/1988 | Brandenfels | 180/214 |
| 4,776,416 | 10/1988 | Morse | 180/216 |
| 4,846,295 | 7/1989 | Shepard et al. | 180/907 |

FOREIGN PATENT DOCUMENTS

| | | | |
|---|---|---|---|
| 1810445 | 7/1969 | Fed. Rep. of Germany | 280/287 |
| 2038816 | 3/1971 | Fed. Rep. of Germany | 280/287 |
| 2376784 | 9/1978 | France | 180/68.5 |

*Primary Examiner*—David M. Mitchell
*Attorney, Agent, or Firm*—Dowell & Dowell

[57] ABSTRACT

A riding scooter that may be assembled and dis-assembled without the use of tools is formed of components of a size and weight such that they may be handled by a person of modest physical strength. The scooter's front and rear sections have overlapping interengaging parts that are biased together in the operative position by the weight of the sections alone. Batteries for electrical power are contained within casings which are cooperatively retained within a battery housing and which also permit the batteries to be simultaneously electrically connected to the vehicle electrical system upon insertion of the battery casings within the battery housing. A steering tiller is detachably mounted to the front steering yoke being retained in an operative position by a quick release locking collar. Control for forward and reverse movement is accomplished through linkage which permits convenient manipulation of the control handle while providing maximum adjustment of an electric potentiometer which controls the electric motor; and, the seat assembly is designed to retain a selected adjustment from disassembly to assembly and further acts to reinforce the biased engagement of the front and rear sections of the scooter.

30 Claims, 11 Drawing Sheets

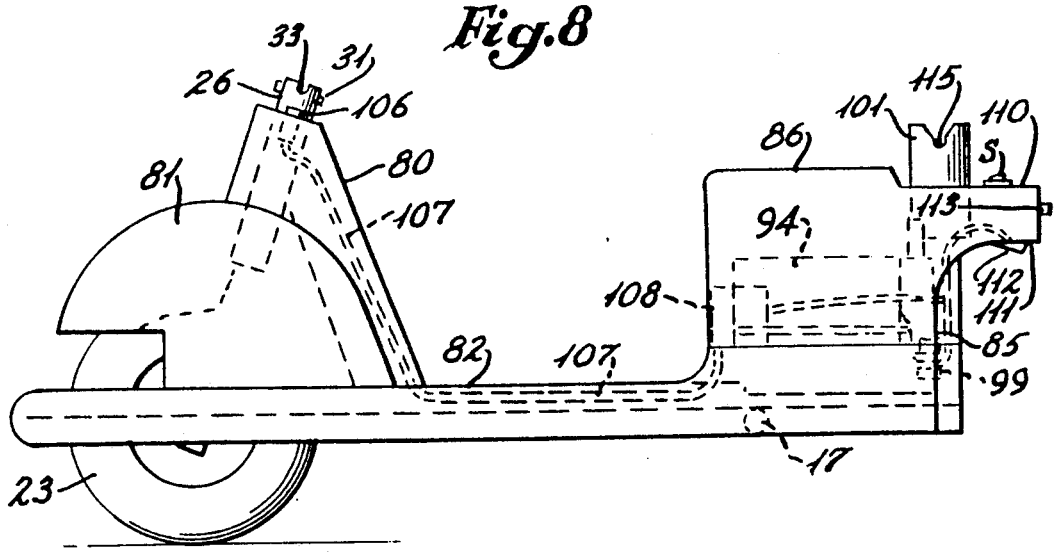
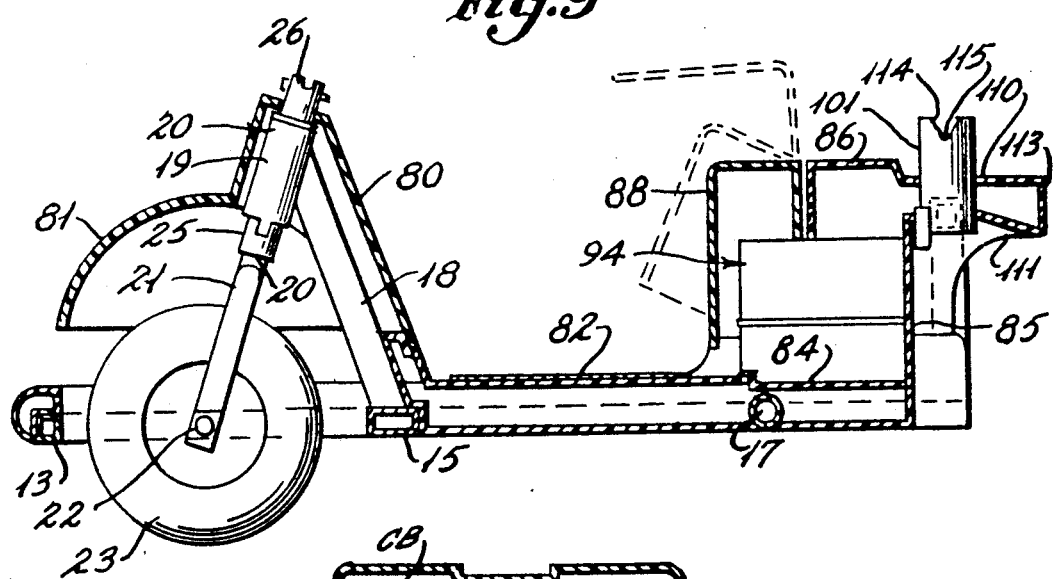
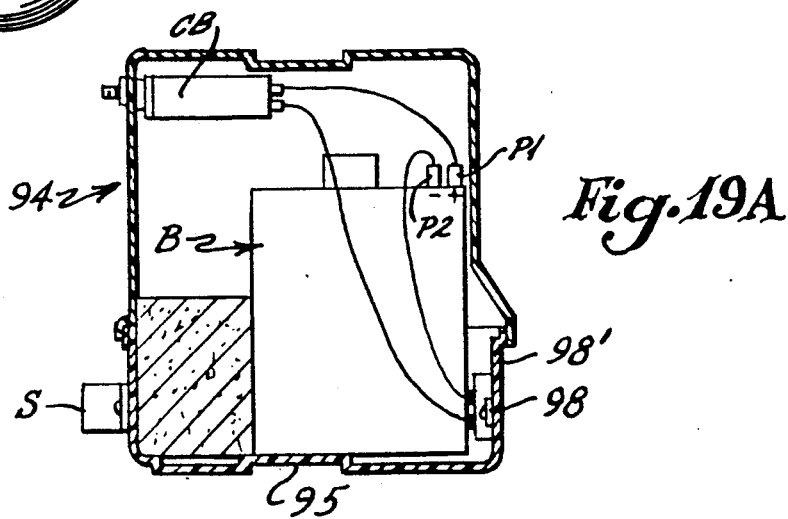

DISASSEMBLABLE RIDING SCOOTER

BACKGROUND OF THE INVENTION

1. Field of the Invention

This invention is generally directed to riding scooters and more specifically to electrically powered riding scooters which include primary components which may be readily assembled and disassembled without the use of tools and which components are of a size and weight that permit the components to be easily handled by an individual of modest physical strength. The scooters of the present invention are particularly designed to permit the scooter to be collapsed for ease of portability of the scooter from one location to another with the primary components interengaging with one another to form a unified and safe structure but with such components being disassembled utilizing minimum physical effort.

Although the embodiment of scooter disclosed in the specification reflects a three wheeled invalid cart or scooter, the teachings of the present invention would apply to other electrically powered vehicles such as golf carts and light weight surface vehicles such as utilized in the warehousing industry. Also, although a three wheel cart is disclosed, a four wheel cart could also be developed utilizing the teachings of the present invention.

The invention is also directed to providing specialized forward and reverse controls which may be utilized with electrically powered scooters and which permit a full range of control utilizing minimal effort on the part of the individual utilizing the scooter.

The invention is also concerned with providing a quick connect and disconnect locking collar for enabling portions of the scooter to be retained in an assembled position and yet released for disassembly by a simple twist and pull motion applied to the locking collar.

The invention is also direction to providing a unique electrical system for electrically powered scooters which not only enables primary components of the scooter to be automatically electrically engaged upon assembly of the components but further permits the battery source of electrical power to be automatically engaged with the electrical system by utilizing a special battery casing which is designed to promote an automatic electrical connection with the electrical system upon placement of the casing within a housing provided on the scooter.

The invention is also directed to providing special seat mounting arrangements for electrical scooters wherein a selective vertical adjustment of a primary seat post may be achieved and retained without having to alter the adjustment to affect a disconnection of the seat support post with respect to the supporting frame of the scooter.

2. History of the Related Art

There have been many forms of vehicles developed for facilitating the movement of invalids or individuals who have trouble walking perhaps due to a physical injury, the individuals age, or limitations enforced upon the individual due to health related conditions. The most common example of invalid transport vehicle is the wheelchair. Numerous innovations have been made in the wheelchair more comfortable to the only to make the use of wheelchairs more comfortable to the individual but to provide increased operational efficiency, maneuverability and collapsibility.

The most basic type of wheelchairs were structures that were designed to be rigidly constructed with little concern being given to enabling the wheelchair to be transported from one area to another in a convenient manner. Advancements in technology and design have resulted in collapsible wheelchairs which may be folded compactly for storage in a persons' trunk so that a wheelchair may be transported from one site to another.

Unfortunately, conventional wheelchairs are not suitable for use by many individuals who because of age or disability cannot provide the necessary strength to maneuver the chairs from one point to another thereby necessitating that assistance be provided to wheel the individual from one point to another.

To overcome the foregoing disadvantages with conventional wheelchairs, a great deal of effort has been directed toward developing self powered invalid carts or vehicles which can be operated through the use of easily accessible manual controls. Such motorized carts have enabled individuals having a disability which requires their use of a cart to have the freedom of individual movement without having outside assistance.

The earlier motorized wheelchairs took the form of conventional wheelchairs, however, were adapted by providing a battery powered motor having a drive engagement to the primary wheels of the wheelchair. Appropriate steering controls were provided usually along one of the arms of the wheelchair with the drive linkage being directly connected to either the front wheels of the wheelchair or to one or more separately provided steering wheels. Due to the drive engagement between the motors and the primary wheels of the earlier type of motorized wheelchairs, there was no provision made for collapsing the wheelchairs to facilitate their transport from one area to another. This resulted in oftentimes necessitating that an individual have one motorized wheelchair provided at their place of business or other area and another motorized wheelchair provided at their home. When it became necessary to travel to an area where no wheelchair was available, there was a great amount of work entailed to disassemble the wheelchair so that is could be transported to such area for use by the individual requiring the chair.

Over the years, the overall structural features of electrically powered motorized carts have evolved away from the style of the conventional wheelchair with many of the carts in use today resembling three wheeled scooters very similar in appearance to miniaturized golf carts. Many of the newer cart like designs are more particularly suitable for those whose disability has not affected their ability to use their hands to control the speed and direction of the vehicle by operating a steering mechanism and speed controls. The carts are designed to permit their use in substantially any building environment so that the carts may easily pass through existing doorways, around counters and tables and the like. Additionally, and especially in light of the more powerful battery sources which are becoming available, the newer type of invalid scooters also permit long range outdoor travel as well as travel within the home, business or related environments sot hat the disabled individual is given an increased freedom of mobility.

As with the original motorized wheelchairs, the original scooter type invalid chairs had a substantial drawback in that the units could not be easily transported from one area to another without requiring a great deal of effort to disassemble the units which would require expertise not readily available to the average person or to someone who might utilize the scooter. In order to come this deficiency, there have been a number of technological innovations made in an effort to develop electrically powered scooters that will be collapsible so as to facilitate their storage and/or shipment from one area to another. Unfortunately, many of the proposed structures for disassemblable invalid or similar types of carts require that the disassembly be made utilizing various locking bolts and other fasteners which require the use of separate tools. Such assemblies not only require that the tolls be available but that the individual disassembling or assembling the cart exhibit sufficient manual dexterity to accomplish the assembly or disassembly procedure. This, of course, is not always possible especially if the person utilizing the cart suffers from various physical disabilities.

Another problem inherent with disassemblable invalid and similar type carts is that the components which are to be assembled or disassembled are often of such a size or weight that they may not be easily manipulated by a person having limited physical strength. Further, the components themselves may be of such a size as to not facilitate compact storage of the components for shipment of the cart from one area to another.

A further drawback with battery powered electrical carts is that the electrical connections themselves often require a great deal of manipulation which not only requires additional effort in assembling or disassembling a given cart but also necessitates that the individual assembling or connecting the electrical system has sufficient knowledge to properly connect the battery to the electrical system after it has been disconnected.

Some examples of prior art disassemblable or knock down type invalid scooters and related carts having battery powered motor systems are disclosed in U.S. Pat. Nos. 2,919,758 to Newton, et al., 3,249,171 to Kinghorn, 3,369,629 to Weiss, 3,580,349 to Brennan, et al., 4,037,678 to Braune, 4,452,327 to Mowat, et al., 4,570,739 to Kramer and 4,750,578 to Brandenfels. Some additional examples of prior art battery powered motorized carts are disclosed in U.S. Pat. Nos. 4,042,055 to Ward and 4,776,416 to Morse.

SUMMARY OF THE INVENTION

This invention is directed to a disassemblable battery powered scooter or cart formed of a number of separable components which are of a size and weight such that they may be handled by a person of modest physical strength. The scooter includes a front section which incorporates a first wheel for steering the scooter and a rear frame section which is mounted upon support wheels.

The front section has a rear portion having a laterally extending engageable element positioned forwardly of the rear extremity thereof and the rear section includes a laterally extending engaging element positioned adjacent its forward extremity. The engaging element of the rear section is positioned and adapted to engage and support the engageable element of the front section when the rear portion of the front section is brought into overlying relationship with respect to the forward portion of the rear section. The rear portion of the front section includes a first abutment element mounted rearwardly of the engageable element which first abutment element is engageable with a second abutment element carried by the forward portion of the rear section when the engaging element of the rear section engages the engageable element of the front section. In this manner, the weight of the two sections along causes a binding and locking of the two sections into an assembled relationship without the need for extraneous fasteners or supplemental locking components.

In the preferred embodiment, the second abutment element may be formed as a lower seat post receiving tube which, when the front and rear sections are joined, is in axial alignment with an upper seat post receiving tube carried by the rear portion of the front section. The alignment of the upper and lower tubes is such that as the seat post is received therein, the seat post also serves to reinforce the joint or connection between the front and rear sections.

The upper seat post receiving tube includes a V-shaped notch on each side thereof in which is selectively seated a seat post adjusting pine which is extendible through any of a number of aired aligned openings provided along the length of the seat post. In this manner, the seat may be set for a specific height adjustment with the removal of the seat being effected by simply raising the seat and drawing the seat post from the upper and lower tubes carried by the front and rear sections respectively without requiring any tools to enable the disassembly. This arrangement further insures the proper heighth adjustment when the seat post is re-inserted within the tubes to affect assembly.

In the preferred embodiment of the present invention, the motor drive unit is carried within the rear section of the scooter with the batteries being carried within a housing provided intermediate the length of the front section. Electrical contact between the batteries and the drive motor and brake mechanism for the drive wheels is affected by a plurality of electrical spring contacts which are provided in inner facing relationship along the rear portion of the front section and the forward portion of the rear section which contacts are engaged as the two sections are joined as discussed above without further contacts being necessary.

The batteries of the present invention are mounted within casings which are specifically designed so as to be slidingly received within specially tapered recesses formed in the floor of the battery housing. Each battery casing includes a lower portion having converging and downwardly extending side ribs which taper inwardly toward one another from the front to the rear of the battery casing and which are guided by complimentary flanges or ribs provided in the floor of the battery compartment. The battery casing further includes a female electrical connector which is automatically aligned with a male electrical connector mounted in the wall of the battery housing so that as the battery casing is slid into position within the battery housing, the female socket will automatically be aligned by the interaction of the ribs of the battery casing and the ribs or flanges of the floor of the battery compartment so that an automatic connection is made between the battery and the scooter electrical system as the battery is inserted within the battery compartment or housing. The battery casing is further provided with a downwardly depending front rib or flange which interlocks with the front wall of the battery compartment when the battery is in position therein to thereby insure that the battery may not shift relative to its seated position during operation of the scooter.

The scooter of the present invention also incorporates a steering tiller which is coupled to the front wheel carried by the front section by a quick disconnect coupling collar. The tiller includes an outwardly extending pin along tis lower portion which is seated within a pair of spaced grooves formed in the steering shaft which extends downwardly to a yoke in which the front wheel is supported. The quick disconnect coupling member includes an annular body portion which is extendible down over the pin by forcing the collar against a spring element contained within the collar and thereafter rotating the collar so as to align a pair of abutment elements carried and extending inwardly of the collar with a pair of outwardly extending bosses formed on the steering shaft. In this manner, the bosses engage with the locking elements and thereby the tiller is locked to the steering shaft by utilizing a simple push and twisting movement of an individuals' hand.

The preferred embodiment of the invention further incorporates a forward and reverse control mechanism which is mounted below the steering handle carried by the upper portion of the tiller assembly. Electrical control for the forward and reverse of the engine is established through a potentiometer mounted within the tiller assembly. Rotation of the potentiometer contact arm is accomplished through a spring loaded linkage mechanism which is maneuvered by a control handle. The linkage allows the control handle to be moved through a minimum arc but still effectuates a significant rotation of the potentiometer control arm. The control handle is fixedly connected to an inwardly extending link having a slot at its remote end in which a pin fixedly carried by a second link member is slideably received. The second link member is fixedly secured to the control arm of the potentiometer so as to cause rotation of the arm when pivoted. A spring is mounted about the control arm and is engageable at one end with a fixed flange carried by the first link and at the other end by a fixed flange carried by the second link so that as the second link is moved outwardly with respect to the first link the spring will automatically insure a return of the two links to an aligned position. The aligned, zero or center position will cause the potentiometer to electrically effect an automatic braking of the vehicle drive wheels through an electric brake connected to the potentiometer through the vehicle electrical system. However, when moved off center, by movement of the control handle, the potentiometer can be effectively rotated up to five times the amount of movement that the handle is rotated because the second link not only pivots but is slideably pivoted in the slot formed in the first link element. In this manner, maximum potentiometer control for forward and reverse movement is effectuated requiring only minimal thumb manipulation of the control handle.

A further feature of the preferred embodiment of the present invention is that the seat element itself includes a fully collapsible back portion and removable side arm portions which are assembled to the back portion by quick connect pins which are aligned through openings in a mounting tube mounted to the rear of the seat and corresponding openings provided at spaced intervals along the length of a portion of the arm portions. Further, the rm rests may be pivoted so as to be in alignment with vertical extending portions of each arm to thereby permit the arms to be stored in a flat position.

A further feature of the preferred embodiment of the present invention is that the motor and brake assembly are carried within the rear section of the scooter and are mounted so as to be off center with respect to the axle of the drive wheels and rearwardly thereof so that the rear section is automatically tilted so that the front portion thereof is raised with respect to the rear portion thereof when the section is connected to the front section. Stabilizing wheels extending from the rear of the rear section serve to establish a proper angle to facilitate the connection of the front and rear sections by inclining the rear section upwardly at a given angle.

It is a primary object of the present invention to provide a battery powered scooter or cart which is formed of a number of primary components which may be readily assembled and disassembled without the sue of tools and which are of a size and weight so as to facilitate their handling and storage by individuals having limited physical capabilities.

It is another object of the present invention to provide an electrically powered cart or scooter wherein the primary front portion and rear portions of the vehicle are joined together by incorporating overlapping interengagine parts that are biased together in the operative position by the weight of the sections alone and which are increasingly biased into engaging position by the weight of the individual utilizing the cart or scooter.

It is also an object of the present invention to provide a battery powered cart or scooter wherein the electrical connections between the primary front and rear portions is effected automatically upon the biasing together of the front and rear portions.

It is yet a further object of the present invention to provide a battery powered scooter or cart wherein the batteries are contained within specially designed casings which are cooperatively and slidingly engaged within a battery storage compartment in such a fashion that the electrical connection of the battery to the vehicle's electrical system is accomplished by simply inserting the batteries within the battery compartment.

It is another object of the present invention to provide a seat for use with battery powered carts or scooters wherein the height of the seat is assured from disassembly to assembly by enabling the seat to automatically assume the proper height when being reassembly without modifying or adjusting the components which affect the height adjustment.

It is yet a further object of the present invention to facilitate the control of a battery powered cart or scooter by enabling minor movement of a control lever by an individuals' fingers or thumbs but obtaining maximum control over an electrical potentiometer which effectuates the electrical control of the front and rear drive mechanism.

It is also and object of the present invention to provide a steering assembly which may be quickly connected and disconnected without requiring separate parts which may be accidentally mislaid during assembly or disassembly.

It is also an object of the present invention to provide a cart that is powered by batteries which is not only securely structured and safe in operation but which is light weight and conveniently disassemblable for easy storage and/or shipment.

BRIEF DESCRIPTION OF THE DRAWINGS

Other objects and advantages of the invention will become apparent from the following description in conjunction with the accompanying drawings in which:

FIG. 8 is a side elevational view of the front frame assembly showing wiring in dotted line.

FIG. 9 is a vertical section, taken from the same side as FIG. 8, through approximately the middle of the front frame assembly.

FIG. 19A is right side sectional view take through the battery casing and showing the battery.

DESCRIPTION OF THE PREFERRED EMBODIMENT

Overview

The scooter of the present invention includes front and rear frame assemblies that are connected by interengageable members which permit easy disassembly. A front frame assembly has a tiller and steering sub-assembly interengaged with a single supporting wheel. The tiller sub-assembly is easily disconnected from the shaft connected to the yolk in which the wheel is mounted. At its upper end, the tiller sub-assembly has a steering bar and electrical controls which include a forward-reverse lever. The front frame assembly also includes a battery housing for receiving batteries which are housed in special casings, and further includes an interface for interconnecting with the rear frame assembly both mechanically and electrically without requiring separate fasteners.

The rear frame assembly has an interface for connecting mechanically and electrically with the front frame assembly, a drive unit sub-assembly and a seat sub-assembly.

Front Frame Assembly

Figure 6:
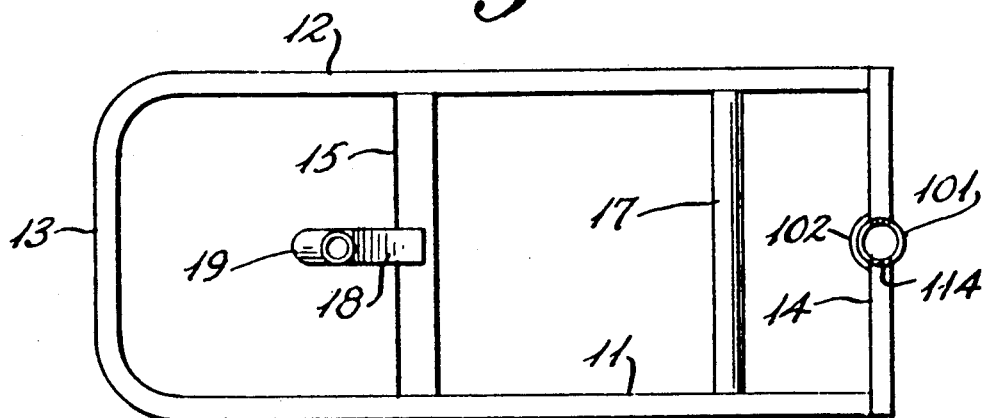
FIG. 6 is a top plan view of the front frame.
Figure 7:
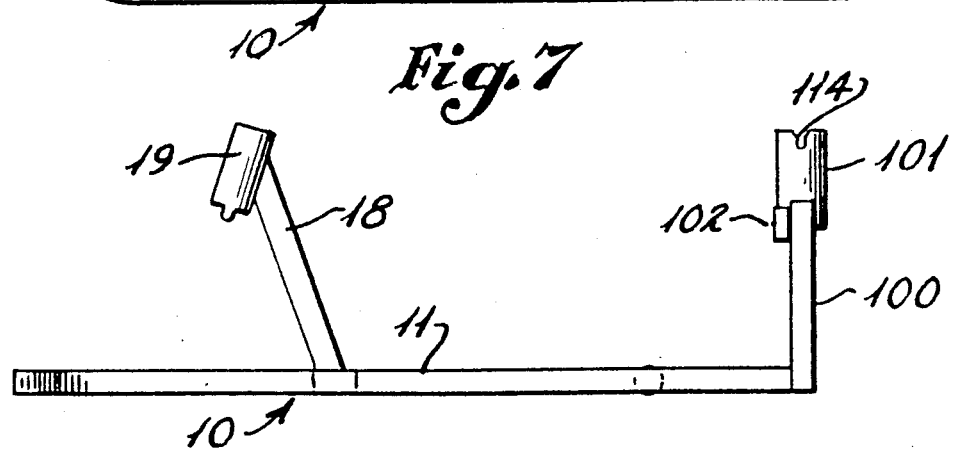
FIG. 7 is a side elevational view of the front frame.

The front frame assembly includes a frame 10 which is shown in detail in FIGS. 6 and 7. The frame includes side members 11 and 12, a front bumper bar 13 and a rear bar 14. Spaced substantially back from the bumper bar 13 is a tiller support cross-bar 15. Spaced forwardly of the rear bar 14 is a cross member 17 which is receivable within an engaging member of the rear frame assembly as will be described in detail hereinafter. The sections of the frame may be of box section or other preferred construction and may be formed of metal, a combination of metal and plastic or entirely molded from a high strength plastic to reduce the weight of the frame.

The cross-bar 15 carries a forwardly and angularly inclined strut 18 which mounts a collar 19 within which the post 20 of the steering yoke 21 which carries an axle 22 to which the front wheel 23 is rotatably mounted.

The yoke post 20 has a collar 25 at its lower end which engages a tube 19 and has a coupling member 26 at its upper end for engaging the lower end portion of the tiller post 27. Mounted centrally and extending vertically from the rear bar 14 is an upstanding strut 100 to which is mounted a tube 101 for purposes of which will be described hereinafter.

Tiller and Steering Sub-Assembly

Figure 3:
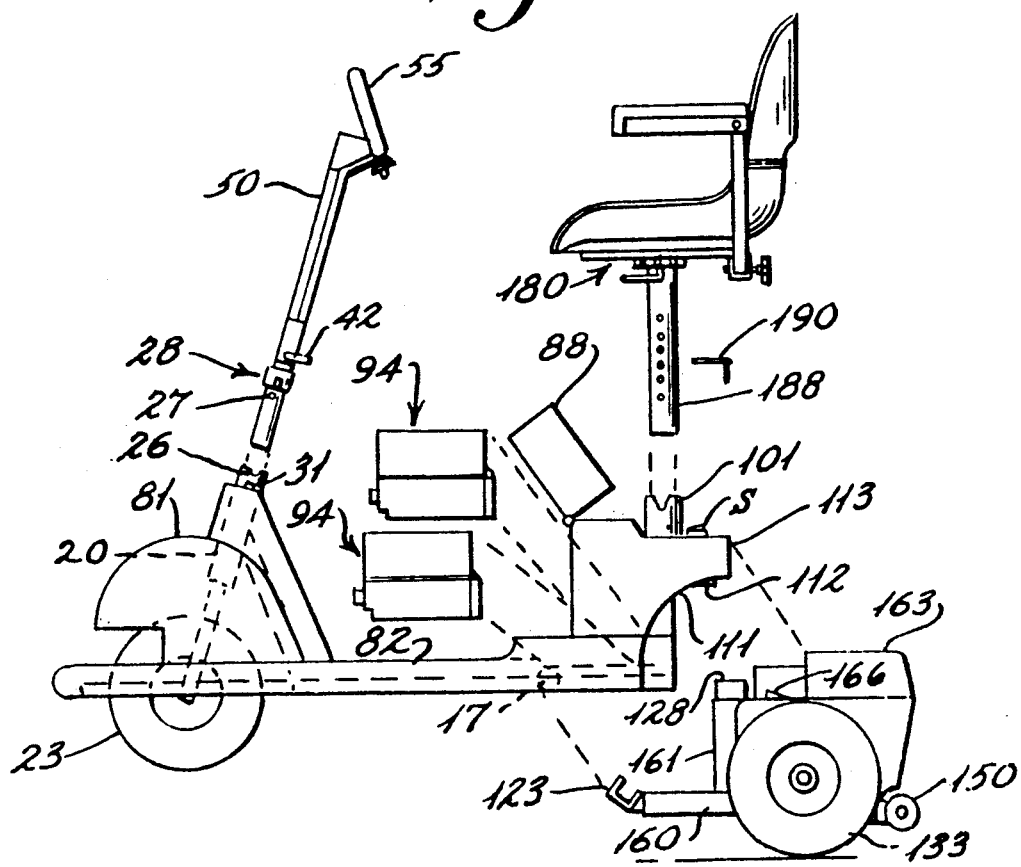
FIG. 3 is an exploded view illustrating the disassembly of the various components of the embodiment shown in FIG. 1.
Figure 10:
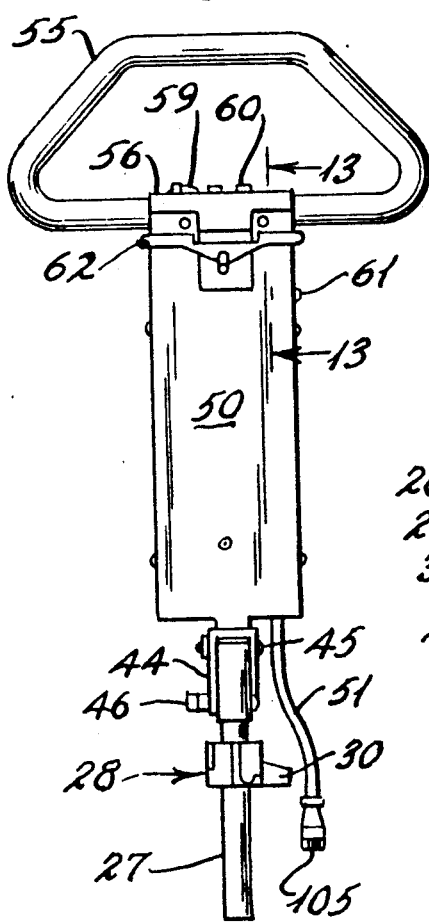
FIG. 10 is a rear elevational view of the tiller and steering sub-assembly.
Figure 11:
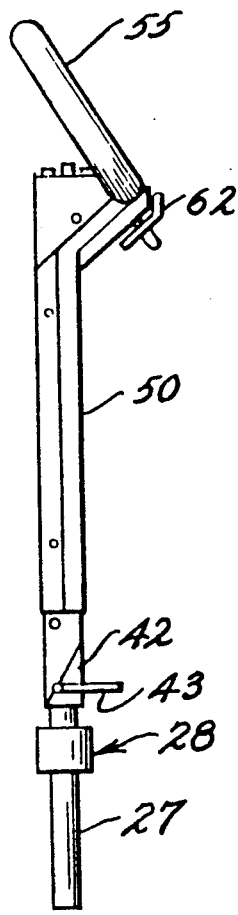
FIG. 11 is a side elevational view of the assembly of FIG. 10.

With particular reference to FIGS. 3, 10 and 11, the tiller post 27 has a coupling sub-assembly 28 which is rotatably mounted on the post 27 for selective engagement with the upper coupling end portion 26 of the yoke post 20. The tiller post coupling sub-assembly is of the quick connect type having an outwardly extending flange 30 to facilitate turning movement of the coupling member. The coupling sub-assembly 28 of the yoke post 20 to selectively engage a pair of outwardly extending lugs 31 to thereby secure the tiller post 27 to the yoke post 20.

The tiller post has an upper section 40 having an angularly disposed plate 41 connected by an angle member 42 and a fastening element 43 to the tiller handle 55. The lower end of section 40 terminates in a fork 44 which is pivotally connected at 45 to the post 27 and has a slot receiving the pin of lever 46 for locking the upper section in an angularly adjustable relationship with the post 27. A cover 50 is provided for the upper portion of the tiller assembly with the cover conceiling not only the upper section of the tiller post but also the electrical connection wires 51 and the electrical assembly as will be described in greater detail hereinafter.

A tiller handle 55 which may be of any desired shape is connected at its central portion to the upper end of the post section 40 in order that the wheel may be steered utilizing the handle.

Coupling Sub-Assembly

The coupling sub-assembly which is utilized to connect the tiller post 27 to the upper end portion 26 of the yoke post 20 is shown in detail in drawings FIGS. 10A-10G. The coupling sub-assembly 28 includes an annular locking collar 29 which is movably mounted about the lower end portion of the tiller post 27. THe locking collar is maintained in place by a bearing pin 32 which extends through a pair of aligned openings formed in the lower end portion of the tiller post and extends outwardly on each side thereof. The bearing pin 32 is selectively seated within opposed aligned grooves 33 formed in the upper end portion 26 of the yoke post 20. In this manner, as the tiller post 27 is inserted into the upper end portion of the yoke post penetration and will further align the tiller post 27 with the yoke post 20 as the bearing pin 32 is seated within the grooves 33.

Figure 10G:
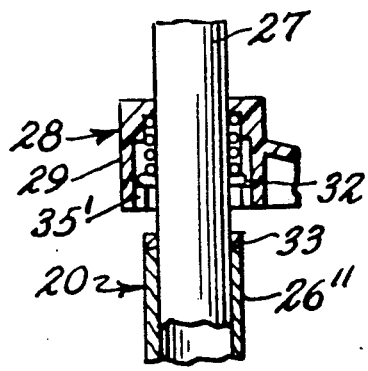
FIG. 10G is a partial cross sectional view of the coupling sub-assembly showing the spring under compression with the locking collar rotated to seat the bearing pin as shown in FIGS. 10C and D.
Figure 10A:
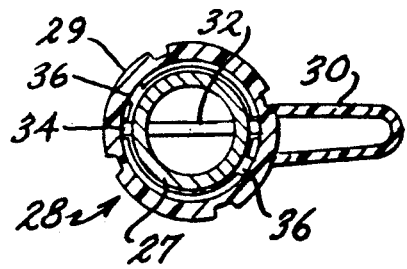
FIGS. 10A-10F are a series of alternating bottom plan views and cross sectional assembly views showing the coupling sub-assembly and its movable relationship with the tiller post and steering yoke post by way of which the tiller is locked to the steering yoke.
Figure 10B:
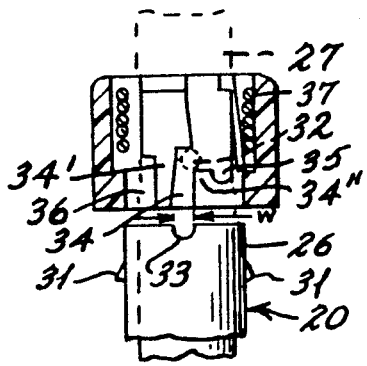
Figure 10C:
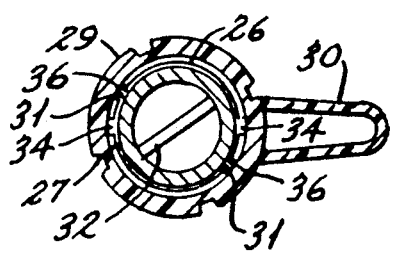
Figure 10D:
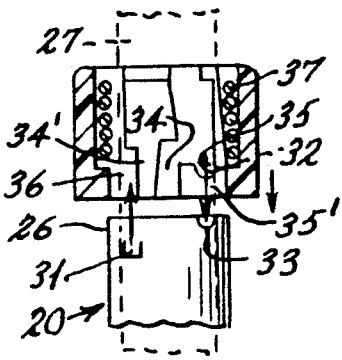
Figure 10E:
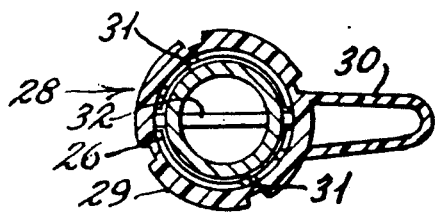
Figure 10F:
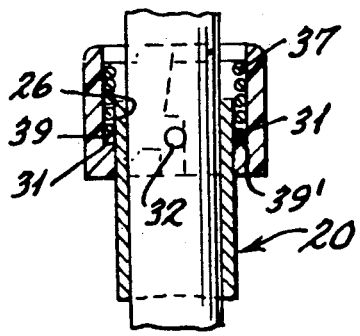

Prior to seating the bearing pin 32 within the grooves 33 of the yoke post 20, the locking collar is first brought into engagement and locked with the bearing pin as illustrated in FIGS. 10A-10D. The locking collar includes a pair of inwardly oriented pin receiving channels 34 which are aligned axially with the outwardly extending flange or manipulating handle 30. The width "W" of the uppermost portion of channels 34 which is defined by inwardly extending flanges or wall portions 34' and 34" is just slightly less than the diameter of the bearing pin 32. In this manner, as the locking collar is urged toward the end of the tiller post 27, the ends of the baring pin 32 will ride up the channels 34 until passing the end wall defined by the inwardly extending flange 34" and thereafter be retained in position due to the narrowed opening defined between the upper portion of the flange 34" and the flange 34'. This position is shown in FIGS. 10A and 10B. Thereafter, the handle 30 is rotated counterclockwise approximately 30 degrees so that the bearing pin 32 will rest in a retention socket 35 formed by inwardly extending wall portions 35" of the locking collar. This position is shown in FIGS. 10C and 10D of the drawings.

With the locking collar shown in a position reflected in FIGS. 10C and 10D, the tiller post is inserted into the upper end of the yoke post until the bearing pin 32 rests within the grooves 33. This motion is reflected by the opposing arrows shown in FIG. 10D. As the baring pin engages the grooves 33, the lowermost portion of the locking collar will extend about the uppermost portion 26 of the yoke post 20. During this positioning, the lugs 31 carried by the upper end portion 26 of the yoke post will pass through channels 36 defined between the flange portions 34' and inner extending flange portions 36'. During this motion, the relative positioning of the locking collar with respect to the bearing pin is insured by a coiled spring 37 which is retained within the upper portion of the locking collar by inwardly extending flanges 38.

With the steering post 27 now mounted on the upper portion 26 of the yoke post 20 and with the locking collar being in a position shown in FIGS. 10C and D of the drawings, the only necessary motion to effectuate a locking between the steering post and yoke post is a first pushing motion in the direction of arrow "P" shown in FIG. 10D whereby the locking collar is urged downwardly with respect to the bearing pin 32 so that the lugs 31 will penetrate deeper into the channels 36. Thereafter the locking collar is rotated clockwise through an angle of approximately 30 degrees wherein the lugs will enter into retention cavities 39 defined by abutment wall portions 39' so that the lugs cannot be withdrawing with respect to the locking collar. Thus, the locking collar is securely engaged with the lugs to thereby units and lock the tiller post 27 with the yoke post 20. The locking collar and bearing pin will be in the relative positions shown in FIGS. 10E and 10F of the drawings.

To disconnect the tiller post from the yoke post, it is only necessary to rotate the locking collar in a counterclockwise direction to the position reflected in FIGS. 10C and 10D whereby the locking collar and tiller post may be withdrawn in a direction opposite to the arrow direction shown in FIG. 10D.

FIG. 10G is a partial cross sectional view showing the relationship between the spring and bearing pin when the locking collar is in a position shown in FIGS. 10C and 10D.

Control Sub-Assembly

With reference to FIG. 6 of the drawings, on the upper surface 56 of the tiller cover 50 electrical controls are mounted including a speed control switch 57, a horn button 58, a battery charge indicator 59 and an on-off switch 60. An ignition switch 61 is positioned below the top cover.

Just beneath the central bar of the tiller handle a forward-reverse lever 62 is mounted so as to be easily engageable by an individuals' thumbs as the individuals' hands grasp the tiller handle. The lever 62 is connected through suitable linkage to a potentiometer 63 (see FIGS. 12-16) having lead 64 connected to the electric drive motor and electric brake in a manner which will be described hereinafter.

Forward-Reverse Sub-Assembly

The forward-reverse linkage sub-assembly is disclosed in detail in FIGS. 12-16. The sub-assembly includes a pivotally mounted main shaft 65 which is fixedly connected to the lever 62 and which shaft is connected to an arm or link 66 that has a depending flange portion 66' which is provided at a short distance from the shaft 65. A slot is formed near the outer end of the arm 66 and thereby defines a pair of spaced guidewalls 67. A potentiometer 63 has a shaft 68 that is rigidly fastened to a follower arm or link 69 having a pin 70 at one end and a flange 71 at the other. The pin 70 extends into the slot defined by the guideways 67 in the arm 66 so as to be in slidable relationship therewith. Shaft 68 has an extension at 68' on which a spring 72 is mounted. The spring includes arms 72' and 72" for engaging the flange 66' of arm 66 and flange 71 of arm 69.

In operation, movement of the lever 62 through a small angle causes a greater angle movement of the potentiometer shaft 68 due to the leverage and the described arrangement of the parts. When the lever 62 is released, the spring automatically urges the lever to a neutral or parallel position with respect to the steering handle as shown in FIG. 14 of the drawings.

Figure 14:
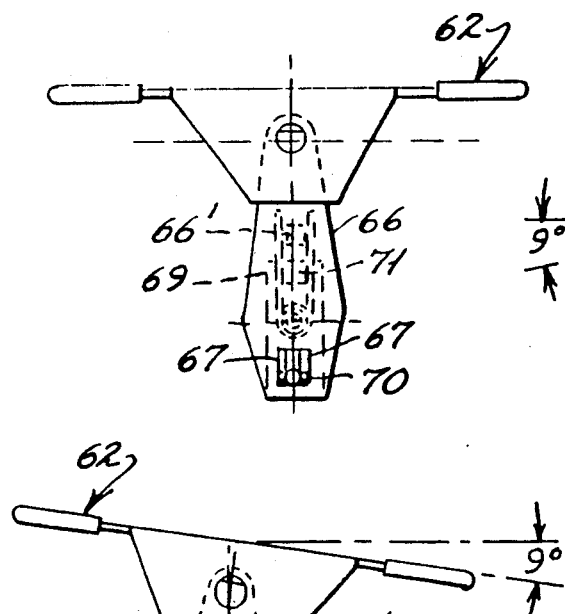
FIG. 14, 15 and 16 are detailed drawings illustrating the movement of the motor control in forward and reverse positions.
Figure 15:
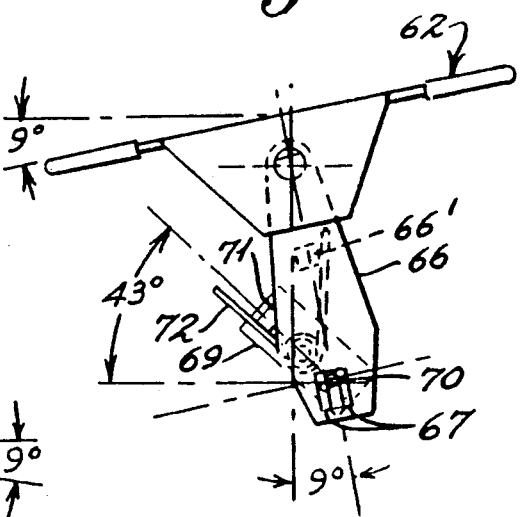
Figure 16:
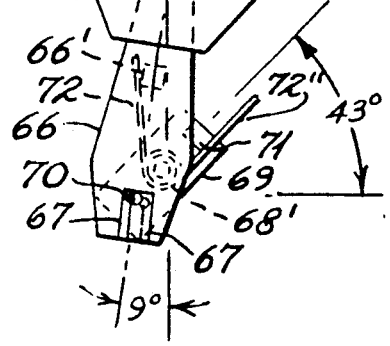

The respective movement of the components of the forward and reverse sub-assembly are shown schematically in FIGS. 14–16. FIG. 14 indicates a neutral position in which the potentiometer is not function to provide electrical energy to drive the scooter either in a forward or reverse position. As a safety feature, whenever the lever 62 is in it's neutral position as shown in FIG. 14, current through the potentiometer is off and the electric brake is applied. In this manner, the scooter cannot be moved as the rear drive wheels will be locked at all times that the forward or reverse lever is in a neutral position. Further, due to the spring elements 72' and 72", the lever is automatically brought to a neutral position any time the operator releases the lever thereby insuring that the scooter will be automatically braked when not intentionally being directed in a forward or reverse direction by the operator.

In case it is necessary to release the brake when the vehicle is not in motion, a separate safety switch "S" (as shown in FIG. 3) may be depressed thereby bi-passing the electrical control to the brake and allowing the rear drive wheels to free-wheel so that the scooter may be manually pushed. As a safety, a horn (not shown) which is mounted beneath the cover 50 of the tiller is activated whenever the switch "S" is activated to allow free-wheeling of the drive wheels.

With continued reference to FIGS. 14–16, the operation of the forward-reverse sub-assembly will be briefly described. From the neutral position shown in FIG. 14, the operator may urge the lever in the direction shown in FIG. 15 in order to obtain a forward movement of the vehicle by supplying energy through the potentiometer 63 to the electric drive motor. It is an important feature of the present invention that the forward-reverse lever be at all times conveniently operable by an individuals' thumbs without requiring the individual to change their hand grip on the steering handle. Therefore, only a minimum amount of lever movement is desired. As shown in FIGS. 15 and 16, the present assembly allows for a total arcuate movement of 18 degrees, 9 degrees to each side of the neutral position. The potentiometer, however, has a rotational range of approximately 86 degrees. Therefore the 18 degree movement must be translated through the arms 66 and 69 to provide the additional rotation of the potentiometer shaft 68.

When shifting the forward-reverse lever 62 to the position shown in FIG. 15, the arm 66 will pivot 9 degrees, however, the pin 70 carried by arm 69 will follow the guideways 67 thereby creating an additional translation of arm 69 to a full 43 degree movement thereby rotating the potentiometer shaft 43 degrees. During this movement, the flanges 66' and 71 will engage the outer ends of the spring thereby placing the spring under tension so that the spring will automatically function to shift the arms back to the aligned position shown in FIG. 14 as soon as the operator releases the forward-reverse lever 62.

With reference to FIG. 16, to operate the scooter in a reverse direction, the lever is simply moved through the 9 degrees indicated thereby accomplishing a reverse rotation of the potentiometer control shaft 68 to reverse the current to the electric motor.

Battery Housing and Battery Casing

The front frame assembly preferably is covered and embraced by a molded body including a tiller base portion 80, a front wheel guard portion 81 and a foot rest portion 82 (see in particular drawing FIGS. 3, 8, 9 and 9A. The foot rest portion extends rearwardly to provide a battery casing support portion 84. At the rear, the body provides a backwall 85 for the battery housing which housing is further defined by a top wall 86 and a hinged front cover portion 88.

Figure 9A:
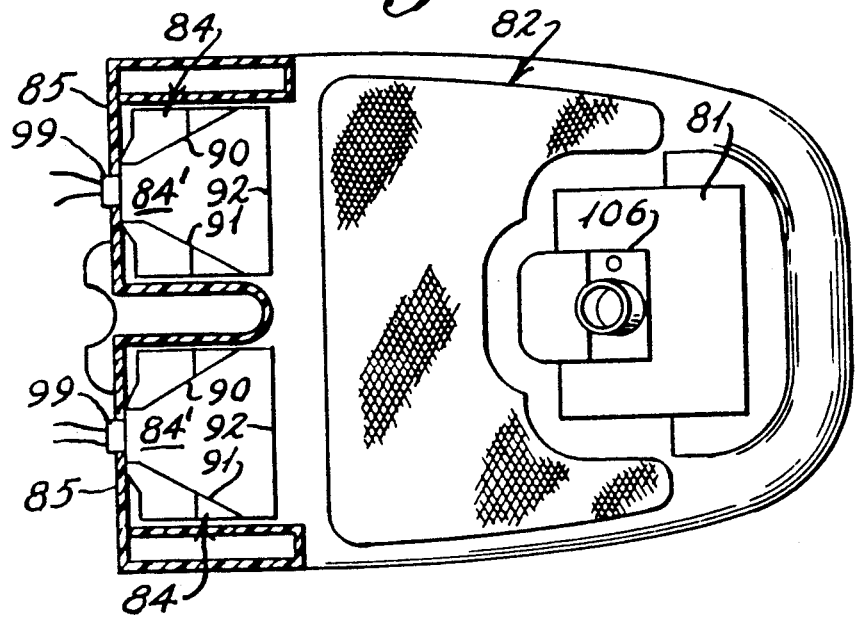
FIG. 9A is a top plan view of the front frame assembly having the cover to the battery compartment broken away to show the details of the battery receiving recesses.
Figure 19:
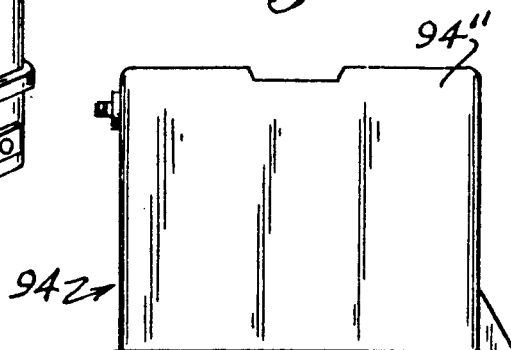
FIG. 19 is a right side elevational view of the battery casing of FIG. 17.

The floor portion 84 of the battery housing is provided with a pair of spaced generally triangularly shaped recesses 84' which are defined by pairs of upstanding ribs 90 and 91 which converge toward one another rearwardly toward the end wall 85 as is clearly shown in FIG. 9A. A front rib 92 is also provided along the front of the battery casing support portion. The recesses defined by the ribs 90, 91 and 92 cooperatively receive battery casings 94 in which conventional batteries "B" are mounted as is shown in FIG. 19A. Each battery casing includes a base portion 94' and a cover portion 94" which are seated with respect to one another so as to fully enclose the conventional battery "B" therein. The upper and lower portions of the battery casing may be united by using a flexible strap or by providing other clamping or securing elements.

Figure 18:
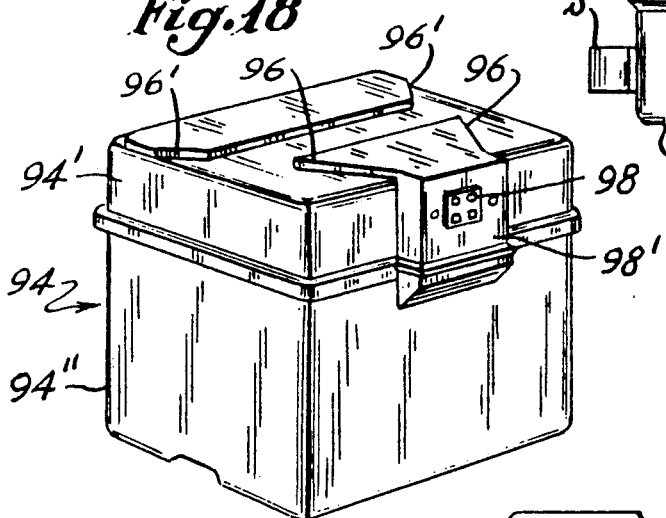
FIG. 18 is a bottom perspective taken from the rear of the battery casing of FIG. 17.
Figure 20:
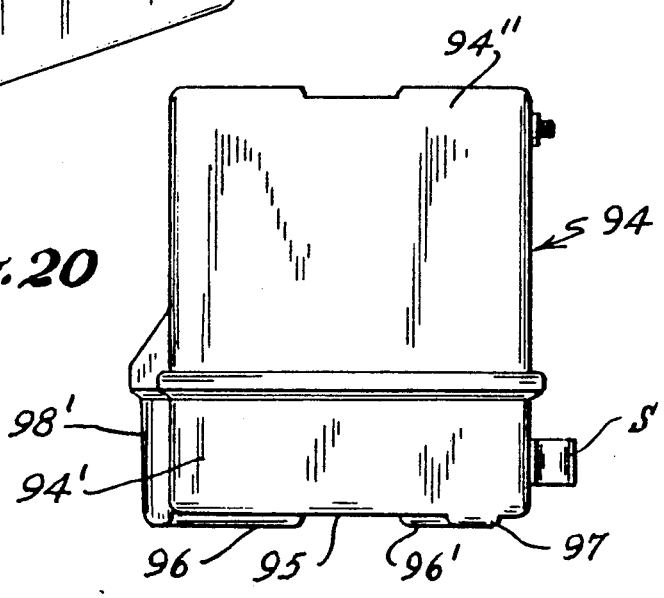
FIG. 20 is a left side elevational view of the battery casing of FIG. 17.
Figure 23:
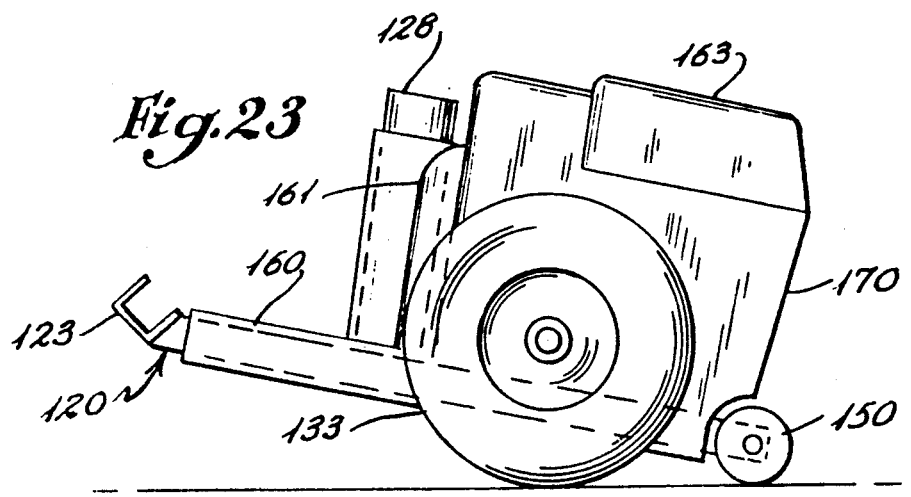
FIG. 23 is a left side elevational view of the rear frame assembly.
Figure 24:
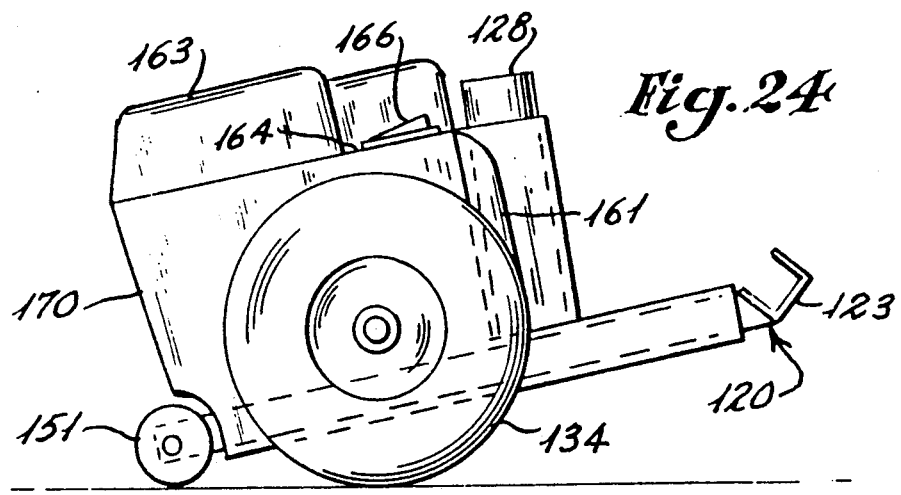
FIG. 24 is a right side elevational view of the rear frame assembly.

With particular reference to FIG. 18, the lower surface 95 of the lower portion of the battery casing includes a pair of converging and inwardly extending wall portions 96 and 96' and a front rib 97 which extends across the width of the lower portion of the casing. The configuration of the ribs 96, 96' and 97 si complimentary to the configuration of the upstanding ribs 90, 9 and 92 which define the recesses 84' so that as the battery casing is introduced into the battery housing, the ribs will guide the battery casing into a preselected seated position within the recesses 84'. Due to the front rib 97 of the battery casing the front rib 92 in the floor portion of the battery housing, the battery casings will be securely retained in their seated position within the recesses during the movement of the scooter.

In order to electrically connect the battery to the electrical system of the scooter, the positive and negative poles P1 and P2 of the battery are connected through a circuit breaker switch CB to a female electrical socket member 98. With particular reference to FIG. 18, it should be noted that the lower portion 94' of the battery casing includes an outwardly extending section 98' in the rear wall thereof through which the female electrical socket is mounted. In this manner, a female electrical connector is presented in a position extending outwardly from the main body portion of the battery casing. With reference to FIG. 9A, a pair of male plug members 99 are mounted through the rear wall 85 which defines the battery housing so as to be in substantial alignment with the central portion of each of the recesses 84'. The male plug members 99 are aligned so that as the battery casings are urged into the recesses 84', the female socket member 98 will automatically align with the male plug member 99 thereby insuring that as the batteries are fitted within the recesses, a complete and secure electrical connection between the batteries and the vehicle electrical system is accomplished without the requirement for additional electrical connections being made.

It should be noted that although the battery casing has been described including a female electrical socket, the casing could be provided with a male electrical plug with female electrical sockets being positioned in the rear wall 85 of the battery housing.

Figure 17:
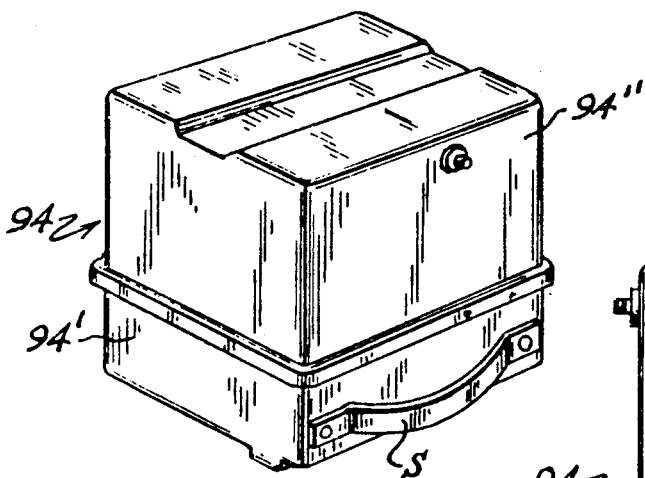
FIG. 17 is a perspective view in an enlarged scale of the battery casing in accordance with the present invention.

To facilitate the removal of the battery casings from the recesses 84', strap members "S" may be provided along the front wall of the lower portions of each battery casing as is shown in FIG. 17. Once the batteries have been installed within the recesses and the electrical connection automatically completed, the hinged front cover portion 88 may be maneuvered to its closed position thereby completely enclosing the batteries and battery casings within the body of the scooter.

Interface for Rear Frame Assembly

As previously mentioned, the front frame assembly has a rear cross-bar 14 and a cross member 17. The cross-bar 14 has an upstanding strut 100 which carries a tube 101 at its upper end. A depending lug 102 extends from the lower portion of the tube 101 along tis forward and outer portion.

With particular reference to FIGS. 8-10, the electrical conductors 51 which extend from the potentiometer mounted in the tiller assembly extend outwardly of the cover portion 50 of the tiller assembly to a remote plug 105. The connector 105 engages a mating plug 106 connected to a series of conductors 107 which extend downwardly through the body 82 for connection to an electrical control module 108 mounted on the side wall of the battery housing adjacent to the floor 84 thereof. The module 108 has suitable leads connected to the plug 99 in the rear wall 85 of the battery housing.

The front frame assembly also includes an extension or rear deck portion which extends rearwardly from the upper or top wall 86 of the battery housing as is shown in FIG. 9. An underlying portion 111 of the extension or deck 110 carries four electric spring blades 112 for interfacing with similar blades mounted on the rear frame assembly as will be described in greater detail hereinafter. Further, the safety switch or brake release switch "S" for releasing the fail safe electric motor brake is also mounted through the extension portion to the control module.

The tube 101, previously described, includes a pair of V-shaped slots 114 in the upper portion thereof which slots includes a central recess 115 for receiving a pin member which extends through the seat post to thereby anchor the seat post with respect to the tube 101 which will be described in greater detail hereinafter.

Rear Frame Assembly

Figure 21:
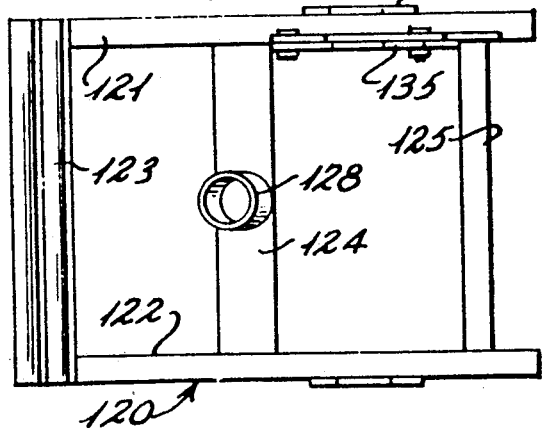
FIG. 21 is a plan view of the rear frame.
Figure 22:
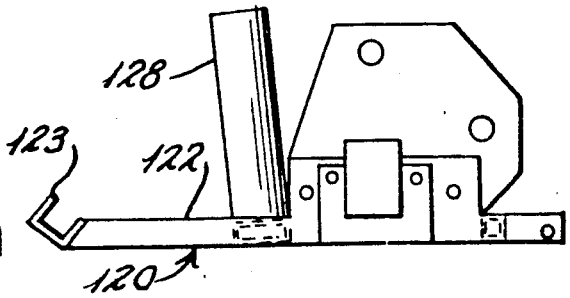
FIG. 22 is a side elevational view of the rear frame.
Figure 12:
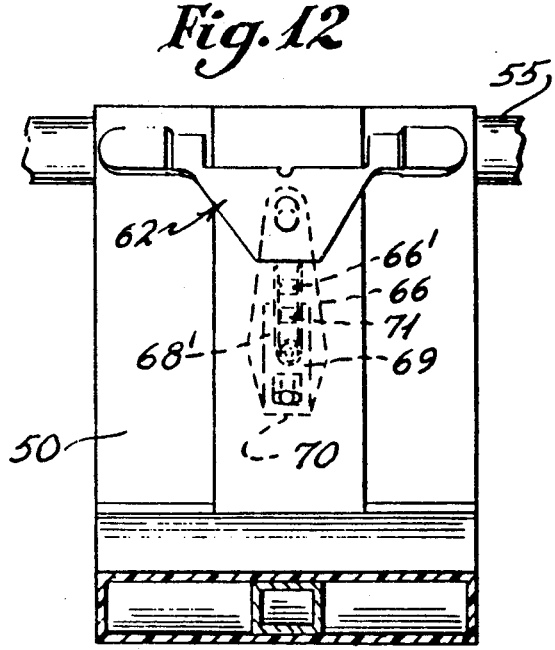
FIG. 12 is a fragmentary elevational view of the upper portion of the tiller assembly showing the forward and reverse motor control.
Figure 13:
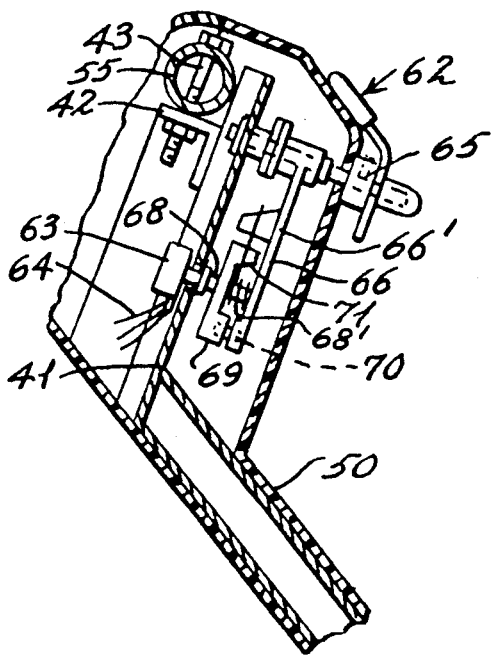
FIG. 13 is a vertical section through the assembly of FIG. 11 taken along the lines 13—13.

The rear frame 120 as shown in FIGS. 21 and 22 includes side members 121 and 122, a front member 123, an intermediate box section member 124 and a rear box section member 125. The front member 123 is substantially U-shaped in cross section and its access is tilted substantially to the rear of the frame as is shown in FIG. 22 in order to facilitate its engagement with the cross member 17 of the front frame assembly.

Figure 25:
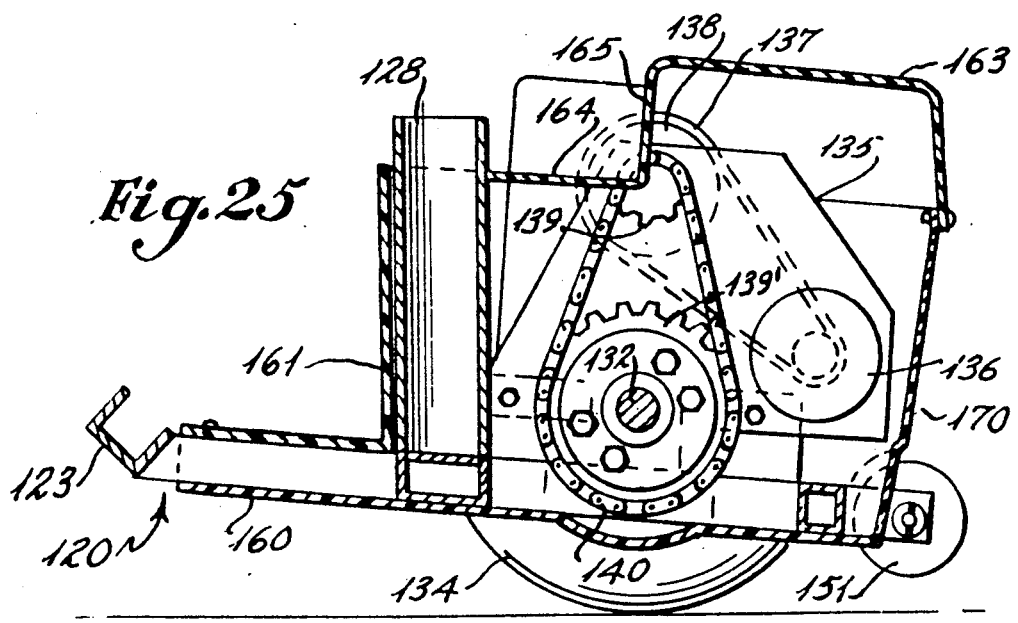
FIG. 25 is a vertical section taken along the lines 25—25 of FIG. 27 and in the direction of the arrows.
Figure 26:
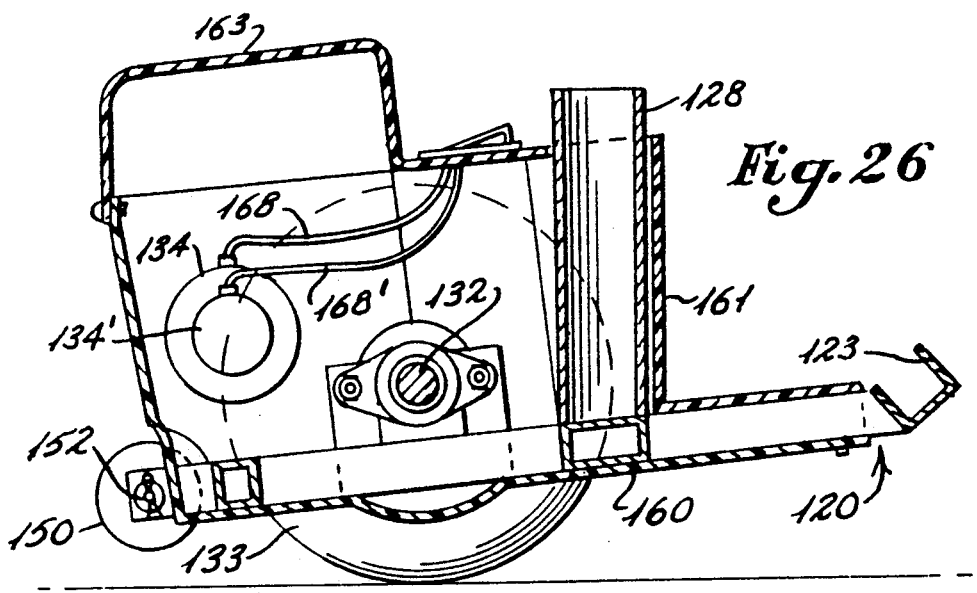
FIG. 26 is a vertical section taken along the lines 26—26 of FIG. 27 and in the direction of the arrows.
Figure 27:
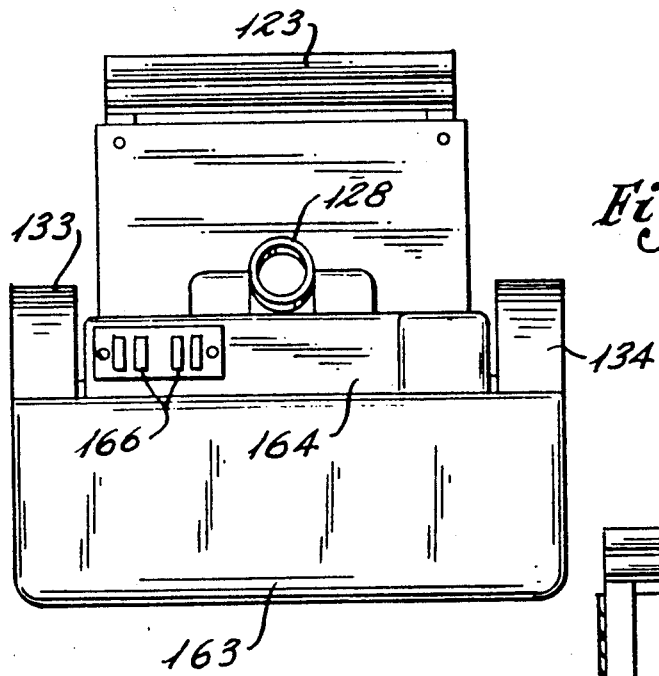
FIG. 27 is a plan view of the rear frame assembly.
Figure 28:
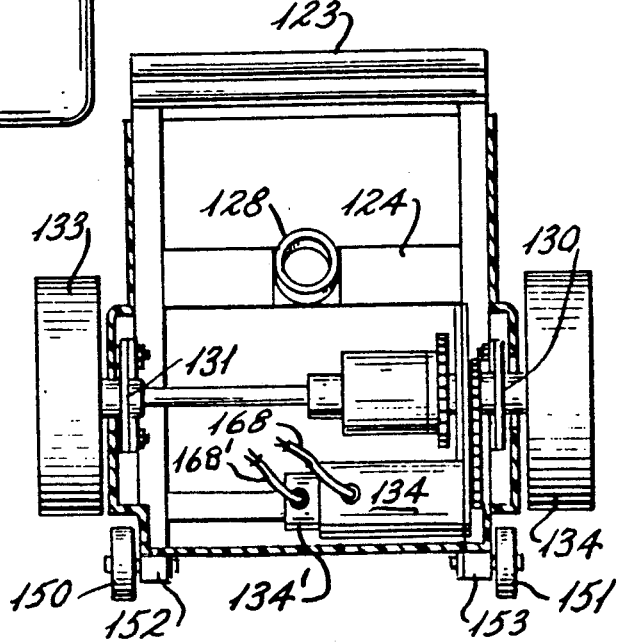
FIG. 28 is a horizontal section through the rear frame assembly along the line 28—28 of FIG. 23 with some portions being shown in elevation.
Figure 29:
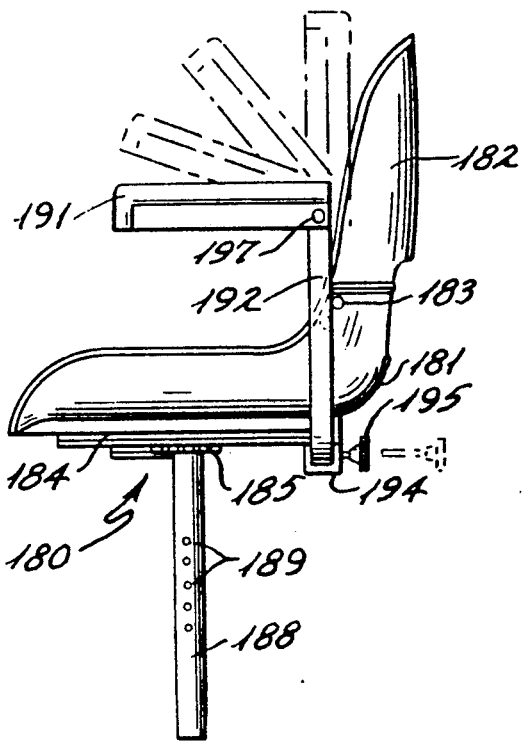
FIG. 29 is a side elevation of the seat assembly in an enlarged scale illustrating the pivotal movement of the arm rest.

The cross member 124 in its central portion, supports an upright tube 128 which is tilted slightly forwardly from a perpendicular position with respect to the plain of the frame members 121 and 122 as is also shown in FIG. 22. The tube 128, when in assembled position, is co-axial with the tube 101 of the front frame assembly. The side members 121 and 122 have plates 130 and 131 for supporting an axle 132 carrying the rear wheels 133 and 134. A slide plate 135 is mounted on the rail 121. As shown in FIGS. 25 and 28, the side plate carries mounting for a motor 136 which drives a timing belt 137 engaged with sheave 138 and chain sprocket 139. Sprocket 139 drives chain 140 which drives a second sprocket 139' mounted to the axle 132 to rotate the rear wheels. A set of freely rotatable tilt wheels 150 and 151 are mounted by suitable bearings 152 and 153 on the rear frame member 125.

With continued reference to FIGS. 23-28, the rear frame assembly includes a multi-body covering which si compatible with that of the front frame assembly. The multi-body covering includes a forward portion 160 which underlies the rearward portion of the front frame assembly. The multi-body covering includes a forward portion 160 which underlies the rearward portion of the front frame assembly so as to be in back of the cross member 17 when the two assemblies are joined. It also includes a front wall 161 which is in facing relationship with the rear wall 85 of the front assembly when the front and rear assembly are in operative assembled relationship. The top wall portion has an upper deck 163 and a lower deck 164. The lower deck underlies the rear deck or rear extension 110 of the front frame assembly when the two are assembled, and the intermediate vertical wall 165 opposes the rear wall 113 of the rear deck 110. Four electrical spring blade contacts 166 are mounted so as to extend upwardly of the deck 164. The blade contacts 166 engage the blade contacts 112 of the front frame assembly when the front and rear frame assemblies are joined.

Two of the contact blades 166 are connected to conductors 168 for powering the motor 134 in order to drive the vehicle. The other two electrical contact blades 166 are connected to conductors 168' which are connected to the safety brake 134'.

In order to charge the batteries mounted within the battery housing, a socket 169 is mounted on the upper wall of the rear deck or extension 110 of the front frame assembly which socket is electrically connected to the control module 108 and to the batteries "B" within the battery casings 94. A suitable battery charger can be connected with socket 169 in order to charge the batteries while they are installed within the scooter.

Interengagement and Disassembly of the Front and Rear Frame Assemblies

Figure 1:
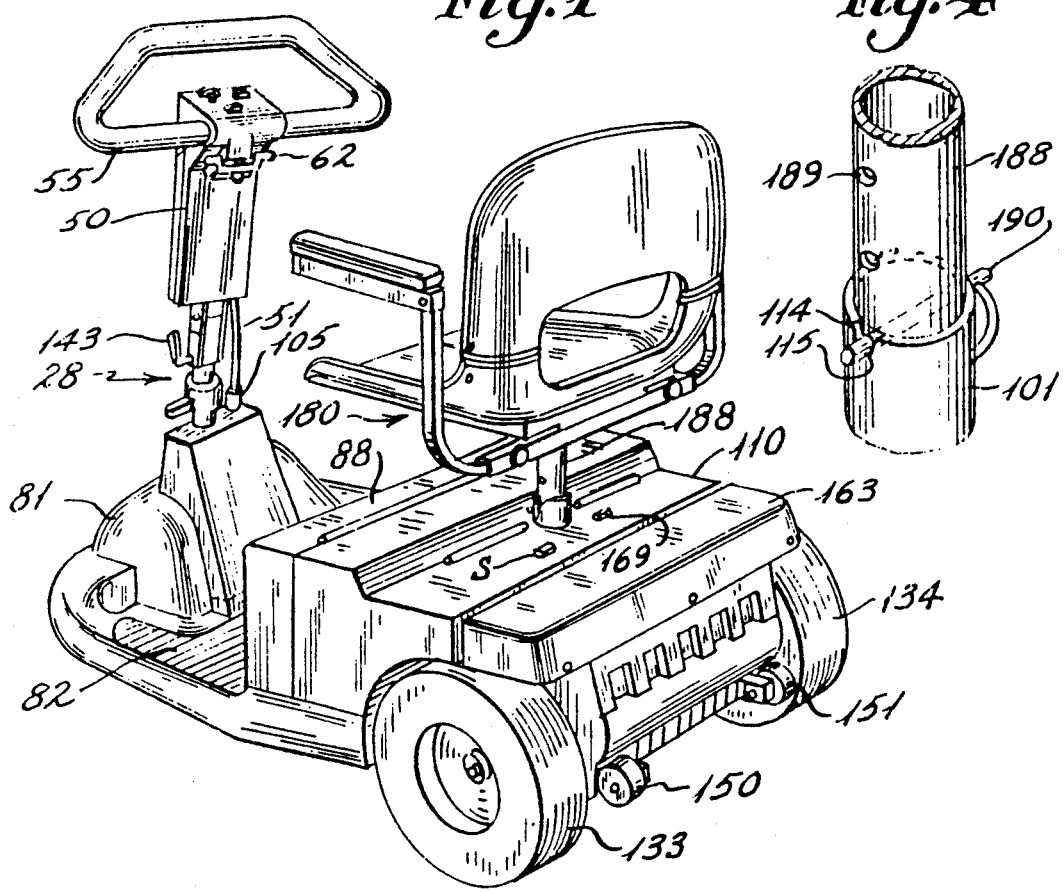
FIG. 1 is a perspective view of a preferred embodiment of the invention.
Figure 4:
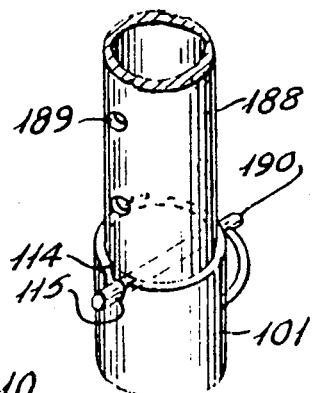
FIG. 4 is a detail illustrating the interengagement of the seat post in the front frame assembly.
Figure 2:
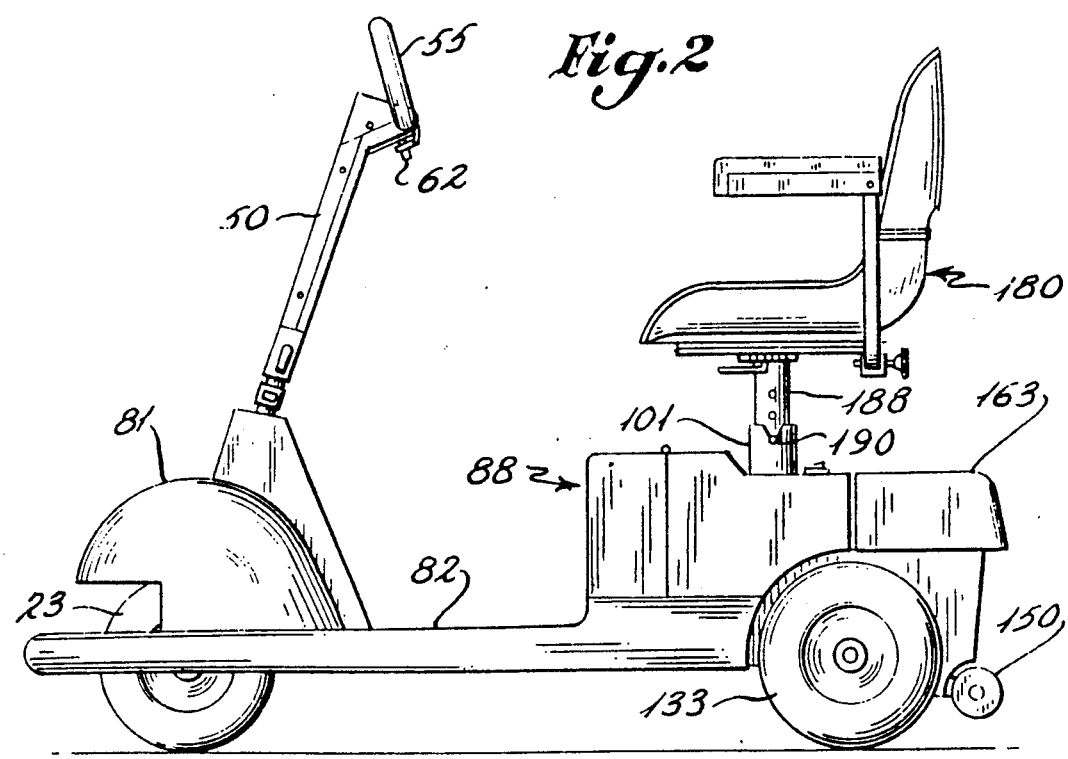
FIG. 2 is a side elevational view of the embodiment shown in FIG. 1.

The front and rear frame assemblies are shown in their assembled relationship in FIGS. 1 and 2. Prior to assembly, the front assembly is illustrated in FIG. 9 and the rear assembly in FIGS. 23 and 24. Particular reference, however, is made to FIGS. 3-3C wherein the assembly of the front and rear assemblies are shown in detail. It will be apparent from FIGS. 3A and 3B that prior to assembly with the front frame assembly, the rear frame assembly tilts backwardly so that its forward portion carrying the engaging cross-member 123 is elevated. This positioning is automatically achieved as the motor is mounted within the rear frame assembly in offset relationship with respect to the axle thereby placing the majority of weight in the rear frame assembly rearwardly of the axle. Further, the tilt wheels 150 and 151 not only are provided for safety purposes when operating the scooter, but the wheels also limit the amount of inclination of the rear frame assembly when disassembled. The angle created is designed to facilitate the assembly of the rear frame assembly to the front frame assembly.

Figure 3A:
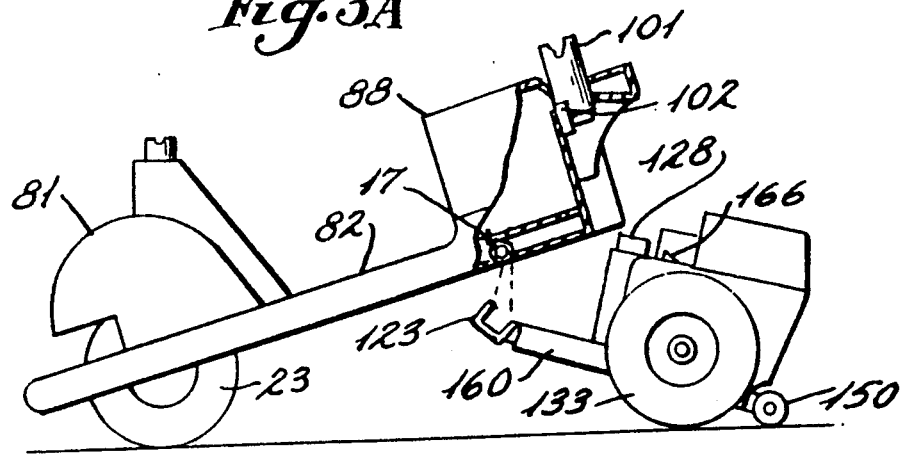
FIGS. 3A, 3B and 3C are side elevational views having portions shown in section illustrating the manner in which the front section or frame assembly is connected to the rear section or frame assembly.
Figure 3B:
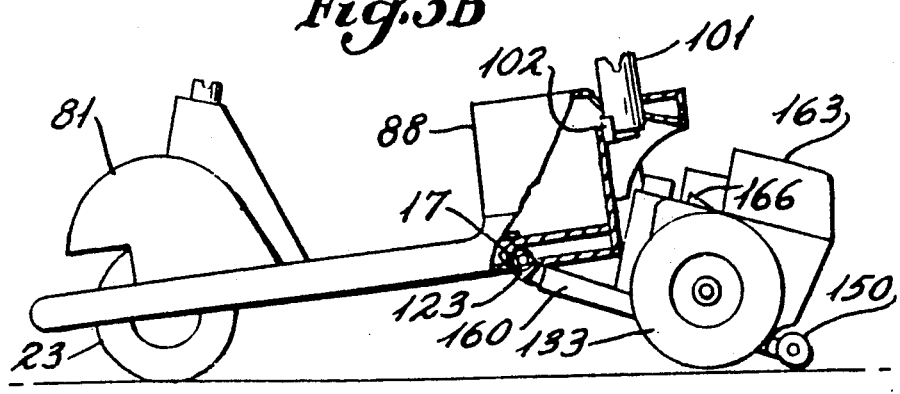
Figure 3C:
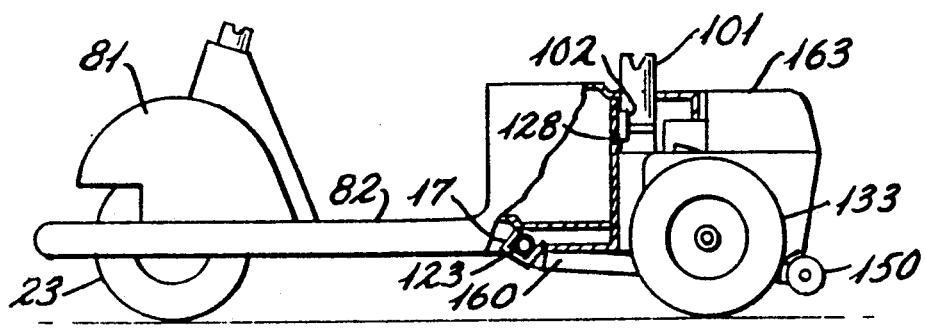
Figure 5:
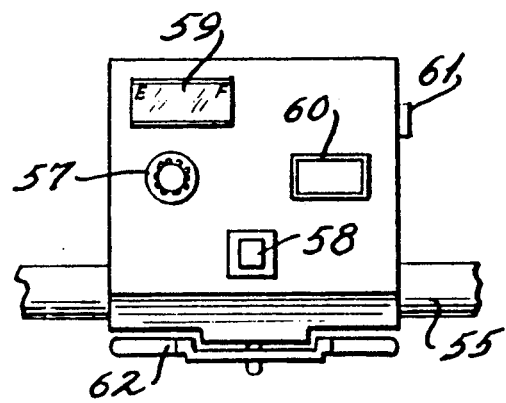
FIG. 5 is a top plan view in an enlarged scale of the control panel of the embodiment of FIG. 1.

When engagement of the front and rear frame assemblies is desired, the two frame assemblies are brought together with the rear portion of the front frame assembly raised so that it is above the inclined front portion of the rear frame assembly as is schematically shown in FIGS. 3A and 3B. If the rear and front frame assemblies are properly aligned, the engaging member 123 carried by the rear frame assembly will engage the cross-member 17 of the front frame assembly at the same time that the upper rear extension or deck portion 110 of the front frame assembly is brought into overlying relationship with the lower deck portion 164 of the rear frame assembly. The overlapping of the rear deck portion 110 and the lower deck portion 164 will automatically align the electric blade contacts 112 so as to engage the rear blade contacts 166 of the rear frame assembly. Therefore, not only are the front and rear frame assemblies mechanically connected to one another by simply lowering the rear portion of the front frame assembly relative to the forward portion of the rear frame assembly but electrical contacts are also established between the electrical system and batteries carried by the front frame assembly and the motor and brake carried by the rear frame assembly.

At the same time that the front frame assembly is lowered relative to the rear frame assembly, the tube 101 is brought into co-axial relationship with the tube 128 of the lower frame assembly. The lug 102 of the front frame assembly which extends below the tube 101 will engage the upper forward portion of the lower tube 128 of the lower frame assembly. The arrangement and spacing of the frame members, the cross-member 17, the engaging member 123 and the lug 102 are such that when their engagement is simultaneously made between the cross-member 17 and the engaging member 123 and the lug 102 with the upper portion of the lower tube 128, the weight of the vehicle along binds the connection thereby retaining the front and rear assemblies in joined relationship with respect to one another. The overlapping relationship of components and the angle of inclination of the engaging member 123 and lower tube 128 further affects the bias between the front and rear frame assemblies. The front and rear frame assemblies may be disengaged by simply lifting the rear portion of the front frame assembly so that the lug 102 disengages the upper portion of the tube 128 and the cross-member 17 disengages the engaging member 123.

Although the front and rear frame assemblies are mechanically and soundly united by the structure disclosed above, a further binding of the front and rear frame assemblies is created by weight of the individual utilizing the scooter. Additionally, and as will be discussed below, the seat includes a post 188 which is selectively extendable through the tubes 101 and 128 and thereby provides an additional lock between the front and rear frame assemblies.

Seat Assembly

Figure 30:
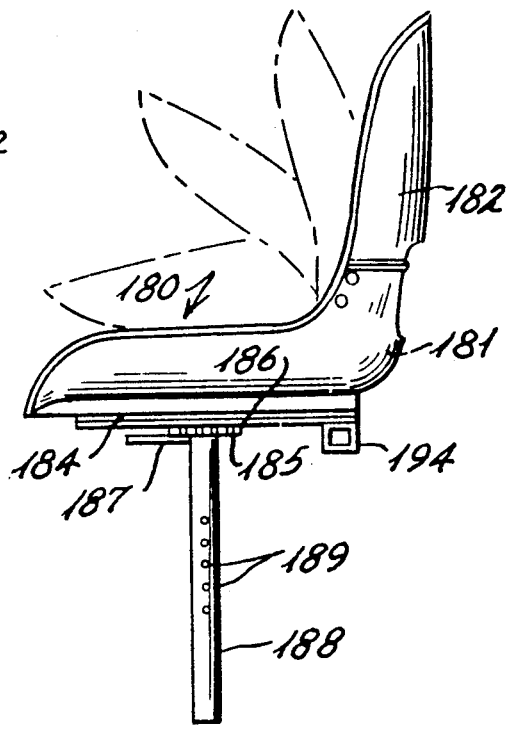
FIG. 30 is a view similar to FIG. 29 illustrating the pivotal movement of the seat back and with the arm rests removed.
Figure 31:
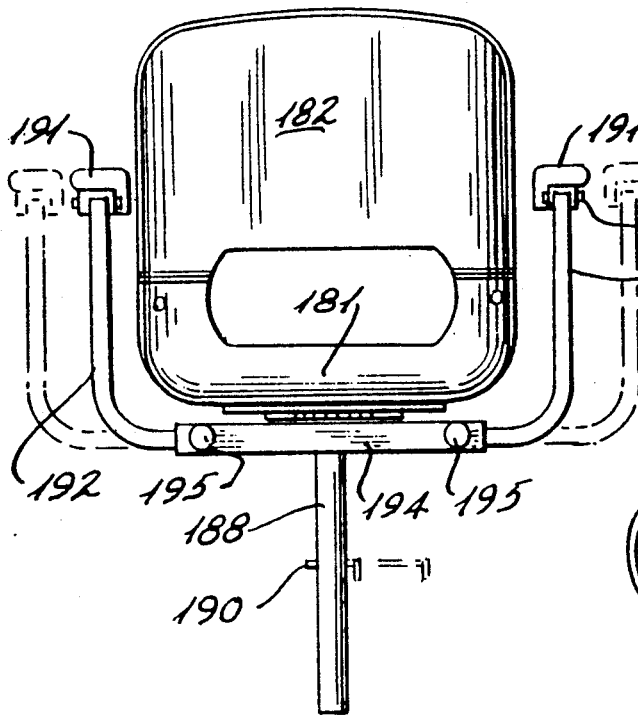
FIG. 31 is a rear elevational view of the seat assembly illustrating the adjustment of the arm rests.
Figure 32:
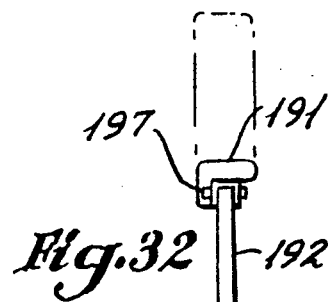
FIG. 32 is a detail of an arm rest.
Figure 33:
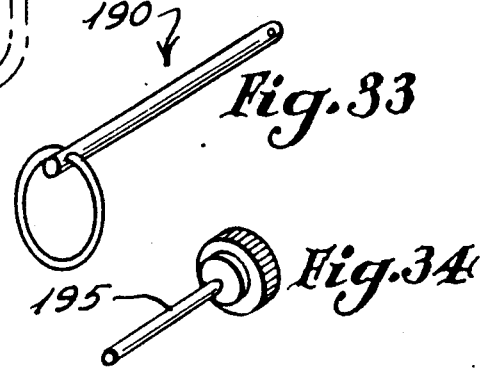
FIG. 33 is a detail of a pin that fits in the seat post.
Figure 34:
FIG. 34 is a detail of the pin for adjustment of an arm rest.

A collapsible adjustable seat assembly 180 is illustrated in FIGS. 30-34. The seat includes a molded bottom 181 and a back 182. The back 182 is movable on a pivot 183 to a collapsed position as indicated in FIG. 30. The seat is mounted on a plate 184 rotatable connected to a circular plate 185 mounted on the upper portion of the seat support post 188. Plate 185 has notches 186 for engagement by a locking mechanism 187 for selectively locking the seat in an adjusted position with respect to the scooter. The seat support post 188 is provided with a series of spaced and aligned lateral openings 189 for selectively receiving a pin 190 in order that the height of the seat may be adjusted. The post slides down into tube or sleeve 101 of the front frame assembly until the pin engages in the central portion 115 of the V-shaped notches 114 provided at the upper end of the tube 101.

As previously mentioned, the lower portion of the seat post extends down through the tube 101 of the front frame assembly and into the lower tube 128 of the rear frame assembly thereby insuring the stabilization of the joint between the front and rear frame assemblies after they have been operatively engaged with one another.

The seat has a pair of arm rests 191 which are mounted on uprights 192 having their lower portions 193 curved inwardly for reception in a channel 194 in which they are slideably received. Quick disconnect pins 195 are provided for each of the arm rests in order that the inward and outward adjustment of the arm rests may be made. Each of the arm rests is mounted by a pivot 197 to the upright 192 in order that the arm rest may be raised for compact storage and also to facilitate entrance and exit of an individual with respect to the seat.

Scooter Dis-Assembly Procedure

It is an important feature of the present invention that the components and sub-assemblies may be relatively easily assembled and disassembled without the use of any tools or separate fasteners or locks. Further, it is another important feature of the present invention that the assembly and disassembly be accomplished in a manner that requires only a modest amount of physical effort so that the scooter may be easily disassembled for transport in another vehicle and then re-assembled as is necessary.

In carrying out the disassembly of the scooter, the following steps are taken. First the electrical connector 105 is disconnected from the mating plug 106 which connects the steering and other controls mounted in the tiller assembly to the vehicle electrical system through the control module 108. The locking collar 29 of the coupling sub-assembly 28 is thereafter rotated counter-clockwise thereby releasing tis engagement with lugs 31 carried by the upper end portion 26 of the yoke post 20. The tiller post 27 is thereafter lifted from engagement with the yoke post 20.

The seat assembly 180 is thereafter lifted vertically so that the seat support post 188 is lifted so that the support pin 190 disengages from the central portion 115 of the V-shaped notches 114 formed in the upper end portion of the tube 101. The seat back may be collapsed for compact storage and the arms removed from the channel 194 by disengaging the quick disconnect pins 195. If necessary, the arm rests may be extended so as to be substantially flat with respect to the remaining portion of the arms for compact storage.

The battery casings 94 are thereafter pulled from their seated position with respect to the recesses 84' formed in the floor of the battery housing by urging the batteries upwardly and forwardly with the straps "S" attached thereto. The batteries are automatically electrically disconnected during this process.

With the remaining component of the scooter removed, the front frame assembly is simply lifted at its rear portion so as to disengage from the front portion of the rear frame assembly.

The components of the invention are specifically designed to be light in weight so that a person of modest physical strength may easily lift the components and place the components in the back of a truck, van or stationwagon or in the trunk of the individual's vehicle so that the entire scooter may be transported as is necessary. The entire disassembly procedure can easily be accomplished in less than a minute. Re-assembly is accomplished by simply reversing the steps outlined above.

We claim:

1. A disassemblable scooter, comprising front and rear frame sections, first wheel means supporting the front frame section, second wheel means supporting the rear frame section, tiller means connected to said first wheel means said front frame section having a rear portion with a laterally extending engageable means positioned forwardly of its rear extremity, said rear frame section having a forward portion with a laterally extending engaging member positioned adjacent to its forward extremity, said engaging member being positioned and adapted to engage said engageable member to connect said front and rear frame sections in operative relationship, a first tube means mounted to said forward portion of said rear frame section and spaced rearwardly of said engageable member, a second tube means mounted to said rear portion of said front frame section nd spaced rearwardly of said engaging member, said first and second tube means being aligned in end to end and axial relationship when said engaging member and said engageable member are engaged to hold said front and rear frame sections together in overlapping relation for the normal operation of said scooter, and post means insertable within said first and second tube means for thereby preventing said front and rear frame sections from being disengaged.

2. The invention of claim 1, in which said engageable member is a rod means and said engaging member is an inverted channel means having a substantially U-shaped cross section which defines an elongated access opening, the opening being oriented upwardly and rearwardly relative to the rear frame section.

3. The invention of claim 2, in which said front frame section rear portion overlies said rear frame section forward portion when said engaging member and said engageable member are engaged.

4. The invention of claim 1 in which said first tube means has an outer surface forming an abutment means on said forward portion of said rear frame section and another abutment means mounted on said second tube means on said rear portion of said front frame section, said abutment means abutting one another when said engaging member and said engageable member are engaged with one another.

5. The invention of claim 4 in which said post means extending through said first and second tube means includes a seat post having upper and lower ends, said lower end of said post in operative position extending down through said first and second tube means, and a seat mounted to said upper end of said seat post.

6. The invention of claim 5 including a removable pin means extending laterally through at least two opposing opening in said seat post, said second tube means having upper and lower portions, a pair of opposing notches formed in said upper portion thereof, said pin means being seated within said notches in order to support said seat post relative to said first and second tube means.

7. The invention of claim 6 in which said pin means is extendible through a plurality of vertically spaced opposing openings in said seat post whereby the height of said seat post may be adjusted.

8. The invention of claim 1 which said front frame section supports battery means, said rear frame section having a rear portion, an electric motor means, said second wheel means being mounted on a single axle extending laterally of and connected to said rear frame section, said electric motor means being so position with respect to said axle with its rear position down and its forward portion up when it is not connected to said front frame section.

9. The invention of claim 1 in which said front frame section includes battery mounting means, a battery means, said rear frame section having electric motor means, said front frame section having first electric contact means positioned adjacent its rear portion and being electrically connected to said battery means, said rear frame section having second electric contact means positioned adjacent its forward portion, said first and second electric contact means being positioned to engage each other when said engaging member and said engageable member are engaged to thereby provide power to said electric motor means.

10. The invention of claim 9 in which said first and second contact means include a plurality of spaced conducting blades.

11. The invention of claim 9 wherein said battery mounting means includes an electric socket means for connection to a battery, said electric socket means being connected to said first electric contact means.

12. The invention of claim 1 in which said second wheel means include at least two spaced wheels having a rear portion and mounted on an axle, said rear frame section, being tilted about said axle so that said forward portion thereof is elevated with respect to said rear portion when said rear frame section is not connected to said front frame section.

13. The invention of claim 9 in which said battery mounting means includes guide means on said front frame section having a pair of opposed first ribs, said first ribs being inclined toward each other from one end toward another toward said rear portion of said front frame section and a third rib extending across the forward portions of said first ribs, and said battery means having a lower surface with second rib means adapted simultaneously to engage said first ribs of the battery mounting means as the battery means is slid rearwardly on said battery mounting means, and said battery means having means to engage said third rib.

14. The invention of claim 13 in which said battery mounting means includes a rear wall, first electric connector means mounted in said rear wall, said battery means having a complementary second electric connector means whereby when said battery means is slid rearwardly on said battery mounting means to bring said battery means into juxtaposition with said rear wall of said battery mounting means, said first and second connector means interengage.

15. The invention of claim 13 including a generally horizontal wall means overlying said battery mounting means, enclosure means at the forward end of said horizontal wall means and pivotally connected thereto.

16. The invention of claim 1 including an electric motor means, said tiller means having a handle means, electric control means mounted on said tiller means adjacent to said handle means, said electric control means including potentiometer mean, said potentiometer means being electrically connected to said electric motor means, lever means mounted adjacent to said handle means, linkage means connecting said lever means to said potentiometer means, said lever means being manually movable to cause a proportional movemental of said potentiometer means in opposite directions.

17. The invention of claim 16 in which said linkage means includes a first arm portion connected to said lever means so that said first arm is pivotable in opposite directions with respect to a neutral position, said first arm portion having an outer end, a slot defined in said outer end of said first arm portion, said potentiometer means including an adjustable shaft means, a second arm portion securely mounted to said adjustable shaft means, said second arm portion having an outer end, a pin means carried by said outer end of said second arm portion, said pin means being engageable within said slot in said outer end of said first arm portion, whereby as said first arm is pivoted by said lever means, said second arm will be pivoted to a greater degree as said pin means transverses said slot.

18. The invention of claim 17 including resilient means connected to said first and second arm means, said spring means normally urging said first arm means to said neutral position.

19. The invention of claim 1 in which said tiller means includes a lower portion, a pin means disposed through the lower portion of said tiller means so as to extend outwardly on either side thereof, said first wheel means including a wheel mounting yoke means, said wheel mounting yoke means including a post means, said post means having an upper end portion, a pair of opposing notches formed in said upper end of said post means, said lower portion of said tiller means being receivable with said post means with said pin means being seated within said opposing notches, a locking collar means movably mounted on said lower portion of said tiller means, said collar means having upper and lower portions, at least two lug means extending outwardly from said upper end portion of said post means and spaced downwardly with respect to said notches, said locking collar means having an inner surface portion, a first pair of opposing vertically extending channels defined in said inner surface portion and having uppermost portions, a second channel associated with each of said first channels and extending radially outwardly with respect to said upper portions thereof, third channels spaced from said first channels and having upper portions, a fourth channel extending radially from said upper portions of each of said third channels, said pin means being slideably receivable within said pair of first channels and thereafter selectively receivable within said second channel means by rotation of said collar means relative to said lower portion of said tiller means, said lug means being receivable within said third channels when said pin means is retained within said second channels with said pin means engaged in said opposing notches in said post means, and said lug means being locked within said collar means by rotating said collar means so as to urge said collar means so that said lug means extend into said fourth channels whereby said collar means abuts said lug means to thereby prevent the withdrawal of said lower portion of said tiller means from said post means.

20. The invention of claim 19 in which said pin means has a first diameter, said upper portion of said first channels having a width dimension which is slightly less than said first diameter, and each said second and fourth channels including a retention cavity in which said pin means and said lug means may be selectively retained.

21. The invention of claim 14 in which said battery means includes a battery, a housing having upper and lower sections, said battery being mounted within said upper and lower sections of said housing, said lower section having a lower wall portion, said second rib means and said means to engage said third rib being formed in said lower surface of said housing, said housing having front and rear portions, said second electrical connector means being mounted within said rear portion of said housing, and means for connecting said second electrical connector means with said battery.

22. The invention of claim 21 including a strap means extending across said front portion of said housing.

23. The invention of claim 22 including a projection portion in said rear portion of said housing, said second electrical connector means being mounted through said projection portion of said housing.

24. A scooter, comprising a front frame section, first wheel means supporting the front frame section, a rear frame section, second wheel means supporting the rear frame section, tiller means coupled to the front frame section, said tiller means engaging said first wheel means for steering it, said front frame section having a rear portion with a first engageable means positioned forwardly of its rear extremity, said rear frame section having a forward portion with a second engageable means positioned adjacent to its forward extremity, said second engageable means being positioned and adapted to engage said first engageable means to connect said front and rear sections in operative relation, said rear portion of said front frame section having a first abutment means mounted rearwardly of said first engageable means, said forward portion of said rear frame section having a second abutment means mounted rearwardly of said second engageable means, said first and second abutment means being position to engage each other when said first and second engageable means are engaged to hold said front and rear frame sections together in overlapping relation for the normal operation of said scooter, said rear frame section having a rear portion, an electric motor means, said second wheel means being mounted on a single axle extending laterally of and connected to said rear frame section, said electric motor means being so positioned with respect to said axle that said rear frame section tilts around said axle with its rear portion down and its forward portion up when it is not connected to said front frame section, said front and rear frame sections being disengageable by lifting said front frame section rear portion so that said first abutment means disengages said second abutment means.

25. A scooter, comprising a front frame section, first wheel means supporting the first frame section, a rear frame section, second wheel means supporting the rear frame section, tiller means for steering said first wheel means, said front frame section having a rear portion with a laterally extending engageable member positioned forwardly of its rear extremity, said rear frame section having a forward portion with a laterally extending engaging member adjacent its forward extremity, said engaging member being position to engage said engageable member to connect said front and rear sections in operative relationship, said rear portion of said front frame section having a first abutment surface located rearwardly of its engageable member, said forward portion of said rear frame section having a second abutment surface located of its engaging member, said first and second abutment surfaces engaging each other when said engaging member and said engageable member are engaged to hold said front and rear frame section together in overlapping relation for the normal operation of the scooter, a first tube means mounted on said forward portion of said rear frame section and a second tube means mounted on said rear portion of said front frame section, said first and second tube means being axially aligned in end to end relationship when said engaging member and said engageable member are engaged to hold said front and rear sections together, and means extending through said first and second tube means to thereby prevent said front and rear frame sections from being separated.

26. The scooter of claim 25 in which said means extending through said first and second tube means is a seat post tube having upper and lower portions, a seat carried by said upper portion, and stop means for selectively positioning said lower portion within said first and second tube means.

27. An electrically powered invalid scooter, comprising a front section, first wheel means supporting the front section, a rear section, second wheel means supporting the rear section, steering tiller means, manually releasable connecting means for connecting said tiller means to said first wheel means, said front section having a rear portion with a laterally extending engageable member positioned forwardly of its rear extremity, said rear section having a forward portion with a laterally extending engaging member positioned adjacent to its forward extremity, said engaging member being positioned and adapted to engage said engageable member to connect said front and rear sections in operative relation, said rear portion of said front section having a first abutment surface rearwardly of its engageable member, said forward portion of said rear section having a second abutment surface rearwardly of tis engaging member, said first and second abutment surface being positioned to engage each other when said engaging member and said engageable members are engaged to hold said front and rear sections together in overlapping relation for the normal operation of said scooter, a first tube means mounted on said forward portion of said rear frame section and a second tube means mounted on said rear portion of said front frame section, said first and second tube means being axially aligned in end to end relationship when said engaging member and said engageable member are engaged to hold said front and rear sections together, and means extending through said first and second tube means to thereby prevent said front and rear frame sections from being separated, an electrical motor carried by said rear section, battery means carried by said front section, and means for electrically connecting said battery means to said electrical motor when said front and rear sections are engaged together.

28. The scooter of claim 27 in which said means extending through said first and second tube means is a seat post tube having upper and lower portions, a seat carried by said upper portion, and stop means for selectively positioning said lower portion within said first and second tube means.

29. A scooter, comprising a front frame section, first wheel means supporting the front frame section, a rear frame section, second wheel means supporting the rear frame section, tiller means coupled to the front frame section, said tiller means engaging said first wheel means for steering it, said front frame section having a rear portion with a first engageable means positioned forwardly of its rear extremity, said rear frame section having a forward portion with a second engageable means positioned adjacent to its forward extremity, said second engageable means being positioned and adapted to engage said first engageable means to connect said front and rear section in operative relation, said rear portion of said front frame section having a first abutment means mounted rearwardly of said first engageable means, said forward portion of said rear frame section having a second abutment means mounted rearwardly of said second engageable means, said first and second abutment means being positioned to engage each other when said first and second engageable means are engaged to hold said front and rear frame sections together in overlapping relation for the normal operation of said scooter, said front frame section including a battery mounting means, a battery, said rear frame section having electric motor means, said front frame section having first electric contact means positioned adjacent its rear portion and being electrically connected to said battery, said rear frame section having second electric contact means positioned adjacent its forward portion, said first and second electric contact means being positioned to engage each other when said first and second engageable means and said first and second abutment means are both engaged to thereby provide power to said electric motor means, said front and rear frame sections being disengageable by lifting said front frame section rear portion so that said first abutment means disengages said second abutment means.

30. The invention of claim 29 in which said battery mounting means includes guide means on said front frame section having a pair of opposed first ribs, said first ribs being inclined toward each other from one end toward another toward said rear portion of said front frame section and a third rib extending across the forward portions of said first ribs, and said battery means having a lower surface with second rib means adapted simultaneously to engage said first ribs of the battery mounting means as the battery means is slid rearwardly on said battery mounting means, and said battery means having means to engage third rib.

* * * * *